(12) United States Patent
Tshering et al.

(10) Patent No.: US 12,737,720 B2
(45) Date of Patent: Sep. 15, 2026

(54) METHOD, SYSTEM, AND COMPUTER PROGRAM PRODUCT FOR RESUPPLY MANAGEMENT

(71) Applicant: Capfora, LLC, Millbrook, NY (US)

(72) Inventors: Tenzing Penday Tshering, Millbrook, NY (US); Grant Kenji Larsen, Millbrook, NY (US)

(73) Assignee: Capfora, LLC, Millbrook, NY (US)

( * ) Notice: Subject to any disclaimer, the term of this patent is extended or adjusted under 35 U.S.C. 154(b) by 183 days.

(21) Appl. No.: 18/468,608

(22) Filed: Sep. 15, 2023

(65) Prior Publication Data

US 2024/0095669 A1 Mar. 21, 2024

Related U.S. Application Data

(60) Provisional application No. 63/407,111, filed on Sep. 15, 2022.

(51) Int. Cl.
*G06Q 10/087* (2023.01)

(52) U.S. Cl.
CPC .................................. *G06Q 10/087* (2013.01)

(58) Field of Classification Search
CPC .... G06Q 10/087; G06Q 10/08; B65G 1/0492; B65G 1/137; B65G 1/1371; B65G 1/1373; B65G 1/1375; B65G 1/1376; B65G 1/1378
See application file for complete search history.

(56) References Cited

U.S. PATENT DOCUMENTS 9,120,622 B1 * 9/2015 Elazary ................ B65G 1/1373
9,305,280 B1 4/2016 Berg et al.
9,656,806 B2 * 5/2017 Brazeau ................... B25J 5/007
10,954,067 B1 * 3/2021 Theobald ............... B25J 19/022
10,955,834 B2 * 3/2021 Stadie .................. B65G 1/0464
11,319,152 B1 * 5/2022 Campbell ............ B65G 1/1375
12,275,586 B1 * 4/2025 Wozniak .............. B65G 1/1371
2013/0332008 A1 12/2013 Herman et al.
2015/0066283 A1 * 3/2015 Wurman .............. G05D 1/0214 701/25
2016/0236582 A1 8/2016 Wang
2016/0236867 A1 * 8/2016 Brazeau ................... B25J 5/007
2016/0339789 A1 11/2016 Wang et al.
(Continued)

*Primary Examiner* — Florian M Zeender
*Assistant Examiner* — Vanessa Deligi
(74) *Attorney, Agent, or Firm* — BEKIARES ELIEZER LLP

(57) ABSTRACT

A resupply management apparatus (RMA) is provided, comprising: a resource container configured to hold a resource; an inventory sensor connected to the resource container, configured to measure: a quantity of the resource held in the resource container, a location sensor for determining a location of the RMA, a wireless communication device configured to transmit data; and means for propelling the RMA through space. The present disclosure further provides a method for operating the RMA, the method comprising: receiving data from an RMA and end use client device, the data indicating the resources and location associated with each device; determining a resource exchange location; and generating instructions to cause the at least one RMA to move to the resource exchange location and exchange resources stored with the at least one end use client device.

12 Claims, 11 Drawing Sheets

(56) References Cited

U.S. PATENT DOCUMENTS

| | | | | |
|---|---|---|---|---|
| 2018/0059635 | A1* | 3/2018 | Johnson | G06K 7/1417 |
| 2018/0194466 | A1 | 7/2018 | Zhao et al. | |
| 2020/0122927 | A1* | 4/2020 | Bellar | G06Q 10/087 |
| 2020/0225665 | A1* | 7/2020 | Rongley | G06Q 10/087 |
| 2020/0279217 | A1* | 9/2020 | Gravelle | G06Q 10/06316 |
| 2020/0354057 | A1 | 11/2020 | Polus | |
| 2024/0045436 | A1* | 2/2024 | Nakano | B65G 1/0492 |

* cited by examiner 722
702
704
706
710
714
714
714
722
702
700

METHOD, SYSTEM, AND COMPUTER PROGRAM PRODUCT FOR RESUPPLY MANAGEMENT

RELATED APPLICATION

Under provisions of 35 U.S.C. § 119(e), the Applicant claims benefit of U.S. Provisional Application No. 63/407,111 filed on Sep. 15, 2022, and having inventors in common, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to autonomous management and distribution of resources. In particular, the disclosure relates to distribution of depletable bulk resources.

BACKGROUND

Machines that gather or otherwise make use of bulk materials a required to spend a large amount of time and effort on movement of those bulk materials. For example, a supply of bulk depletable materials (e.g., battery, electric charge, liquid fuel, screws, ammunition, glue, feed pellets, fertilizer, etc.) used in the useful operation of such machines requires that each machine making use of the bulk depletable material receive a sufficient supply of the depletable bulk material to maintain functionality. Similarly, machine employed in the acquisition or gathering of bulk materials (goods) from device or nodes in the field (e.g., cherries, depleted ammo cases, shell casings, fruit, crops, etc.) may quickly find any bulk material storage available to the machines to be filled to capacity without an adequate plan of managing the bulk material supply.

Traditional supply management methods may involve human manual labor, and/or human management of resources to and from end-use machines. As discussed above, the human manual labor required can consume a significant number of worker-hours, diverting work from other projects or necessitating additional employees for managing the bulk resources.

Current methods may reduce end-use machine uptime by involving its use, time and effort in material movement. For example, in the movement and navigation to resource resupply points in supplying itself with depletable materials (fuel, ammo, batteries, electric charge, blades, drill bits, welding wires, etc.), an end-use machine is spending time that managing resources, when the time could be spent using (or gathering) the resources. Another example, on the goods acquisition side, in the movement of gathered goods (e.g., cherries harvested by harvesting robots, depleted ammo cases for recycling, mined resources, data packets etc.) to collection hubs would require a machine to stop gathering the goods so that the machine could move the goods to a central repository.

Traditional methods may require the installation or prior existence of a fixed material distribution network infrastructure. For example, electric power lines, flex fuel lines, pipes for liquid transport, or conveyor belts. This fixed infrastructure and the limitations it imposes can be expensive to implement. Also, such fixed infrastructure limits changes to the platform in the future.

Accordingly, there is a need for improved resource management platform that increases flexibility and speed in deployment, and scalability of the resource resupply management platform.

BRIEF OVERVIEW

A resupply management system and/or platform may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

The present disclosure provides methods, systems, and an apparatus configured to perform the following stages:

receiving data, from at least one of the following:

a. at least one resupply management apparatus (RMA), and b. at least one end use client device, c. the data comprising at least one of the following:

d. a quantity of resources stored associated therewith, and e. a geographic location associated therewith;

applying an Artificial Intelligence (AI) model to the received data to generate resource exchange data comprising:

a. a resource exchange location, b. an indication of the at least one end use client device with which to exchange resources, and c. one or more instructions that, when executed, cause the at least one RMA to move to the resource exchange location and exchange at least a subset of the resources stored with the at least one end use client device; and transmitting the resource exchange data to the at least one RMA.

Embodiment of the present disclosure further provide a resupply management apparatus (RMA), the apparatus comprising: a resource container configured to hold a supply of a resource; an inventory sensor connected to the resource container, the inventory sensor configured to measure: a quantity of the resource held in the resource container, a location sensor for determining a location of the RMA, and a wireless communication device configured to transmit data; and means for propelling the RMA through space.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
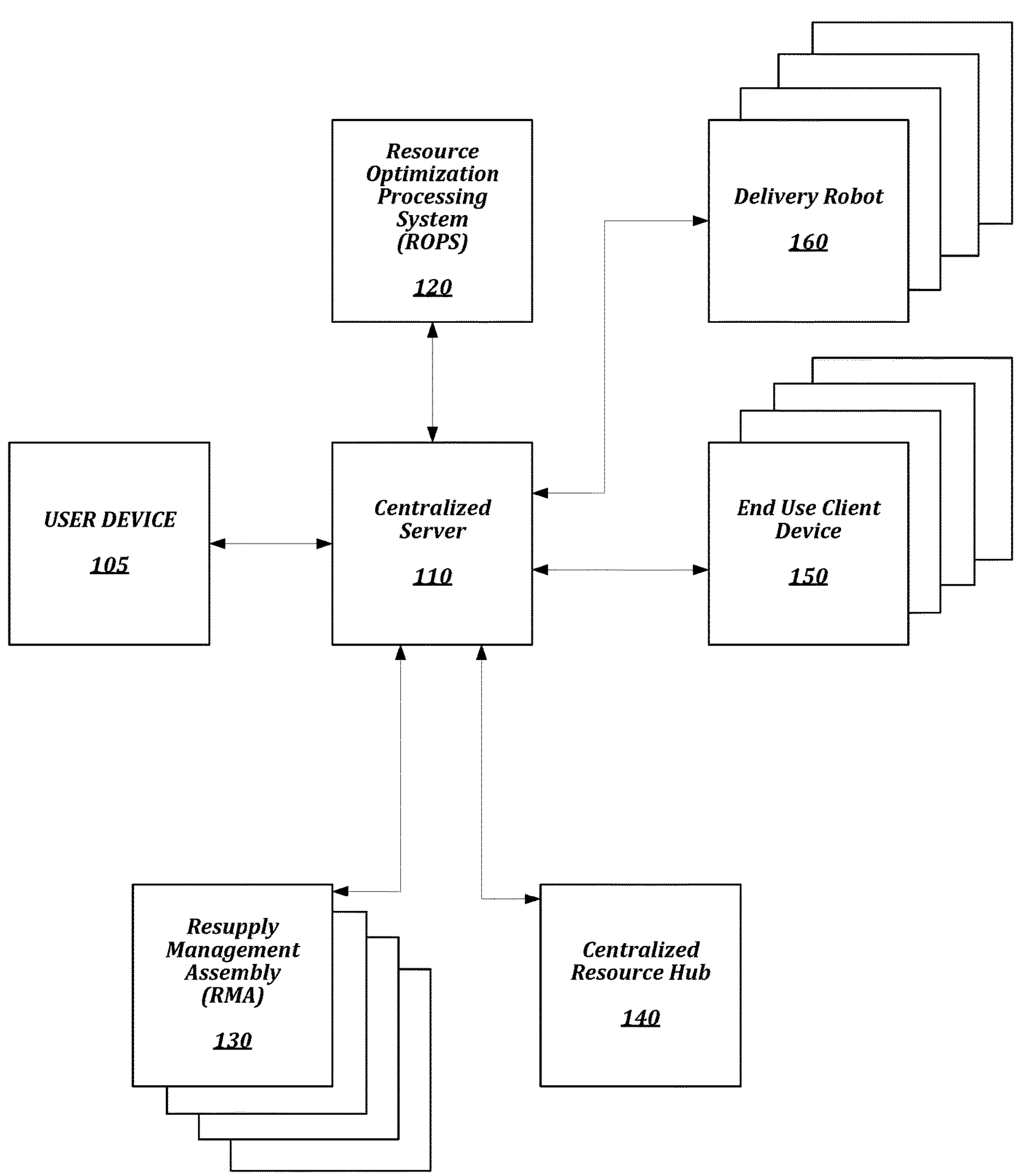
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of a resupply management system and/or platform in the agricultural aspects, embodiments of the present disclosure are not limited to use only in this context. and, by way of non-limiting example, by applicable in supply-chain, distribution, and military contexts.

I. Platform Overview

Consistent with embodiments of the present disclosure, a resupply management platform may be provided. This overview is provided to introduce a selection of concepts in a simplified form that are further described below. This overview is not intended to identify key features or essential features of the claimed subject matter. Nor is this overview intended to be used to limit the claimed subject matter's scope. The resupply management platform may be used by individuals or companies to move bulk supplies used in operation of a machine and/or gathered through operation of a machine between one or more edge devices and a central supply repository.

The resupply management platforms uses one or more resupply management assemblies (RMAs), in combination with a resource optimization processing system (ROPS), and a one or more optional delivery devices to move bulk resources between an end-use client device and a centralized resource hub. In some embodiments, the resupply management platform may move bulk depletable resources from the centralized resource hub to the one or more end use client devices for use by the client devices.

As an example, the resupply management platform may be used in automated agricultural system to distribute supplies used by end use client devices (e.g., supplies to be distributed by the end use devices such as fertilizers, water, food, and/or pesticides, or supplies to be used directly by the end use devices such as fuel and/or battery charge) over a large geographic area. As another example, the resupply management platform may be used to supply defense client devices (e.g., drones, automated turrets) with supplies (e.g., ammunition, fuel, and/or battery charge) for use by the client devices. As a further example, the resupply platform may be used in an industrial setting, such as a warehouse pick/pack/ship operation to distribute supplies used by client devices (e.g., supplies to be distributed by the end use devices such as boxes and tape, or supplies to be used directly by the end use devices such as fuel and/or battery charge) for used by the client devices. As still further examples, the resupply management system may be used to supply end use devices with supplies (e.g., fuel and/or battery charge) in additional contexts, including industrial sensing, security, monitoring systems, and the like. There are many contexts in which the resupply management platform may be used.

Additionally or alternatively, the resupply management platform may move resources gathered by the one or more end use client devices from the client device to the centralized resource hub. As a non-limiting example, in an agricultural context, the resupply management platform may be used to move crops harvested by an end use client device to a central supply hub for storage and/or processing.

Various technical advantages may be realized by the implementation of the embodiments disclosed herein. By way of non-limiting example, the resupply management platform may increase the efficiencies of machines and their coordination by decoupling the distribution and management of resources from the other actions performed by client devices. This decoupling may facilitate the deployment of machine automation, since, in certain embodiments, no pre-existing resupply infrastructure may be required. The decoupling may also facilitate the creation and management of resilient automation deployments. The resupply management platform may further facilitate automation applications by significantly reducing the complexity of design, encapsulating resupply functionality. This can help to increase the value of the automation system, by helping to maximize capital utilization of end use client devices. A resupply management would ensure that a large number of autonomous client devices can operate continuously and efficiently by optimizing the resupply process, minimizing downtime, and ensuring that client devices get resupplied.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Platform Configuration

FIG. 1 illustrates one possible operating environment through which a platform consistent with embodiments of the present disclosure may be provided. By way of non-limiting example, a supply management platform 100 may be hosted on a centralized server 110, such as, for example, a cloud computing service. A user 105 may access platform 100 through a software application. The software application may be embodied as, for example, but not be limited to, a website, a web application, a desktop application, and a mobile application compatible with a computing device 1000.

As will be detailed with reference to FIG. 10 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

In embodiments, the supply management platform may include a resource optimization processing system (ROPS) 120, one or more resupply management assemblies (RMAs) 130, a centralized resource hub 140, one or more end use client devices 150, and/or one or more delivery robots 160.

In embodiments, the supply management platform 100 may include the ROPS 120. In some embodiments, the ROPS 120 may be embodied as a portion of the centralized server 110. In other embodiments, the ROPS 120 may be a separate device in communication with the centralized server 110. The ROPS 120 may be configured to send signals, including command signals to other devices in the platform 100, including, for example, the one or more RMAs, the one or more delivery bots, and/or the centralized resource hub. In embodiments, the command signals may comprise, for example, an order in which devices should receive resupplies, a quantity of supplies each device should receive, a location to which a device should move to receive supplies, a position to which a device should move to deliver supplies, and/or a route a device should take to get to the position. There are many commands that the ROPS 120 is capable of sending. In some embodiments, the ROPS 120 uses data gathered from the other devices that make up the platforms 100, including, for example, device locations, prioritization configuration, route configurations, Bulk Resource levels and use rates to optimize for Bulk Resource availability and distribution.

The ROPS 120 may use Artificial Intelligence and/or artificial intelligence processing techniques to determine which commands to send. In various embodiments, the Artificial Intelligence processing may include use of an Artificial Intelligence engine. Artificial Intelligence includes various techniques in the field of artificial intelligence that deal with computer-implemented, user-independent processes for solving problems that have variable inputs.

In some embodiments, the Artificial Intelligence engine trains one or more Artificial Intelligence models to perform one or more operations. For example, there may be a single Artificial Intelligence model used for all devices in the platform. Alternatively, each class of device may have an Artificial Intelligence model associated therewith. As another alternative, each individual device may have a distinct Artificial Intelligence model associated therewith. Training an Artificial Intelligence model uses training data to generate a function that, given one or more inputs to the Artificial Intelligence model, computes a corresponding output. The output may correspond to a prediction based on prior Artificial Intelligence. In various embodiments, the output includes a label, classification, and/or categorization assigned to the provided input(s). The Artificial Intelligence model corresponds to a learned model for performing the desired operation(s) (e.g., labeling, classifying, and/or categorizing inputs). For example, the Artificial Intelligence model may be used in determining a likelihood of a transaction to complete a stage in particular amount of time.

In various embodiments, the Artificial Intelligence engine may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the Artificial Intelligence engine receives positive and/or negative reinforcement in the process of attempting to solve a particular problem (e.g., to optimize performance in a particular scenario, according to one or more predefined performance criteria). In various embodiments, the Artificial Intelligence engine initially uses supervised learning to train the Artificial Intelligence model and then uses unsupervised learning to update the Artificial Intelligence model on an ongoing basis.

In various embodiments, an Artificial Intelligence engine may use many different techniques to label, classify, and/or categorize inputs. An Artificial Intelligence engine may transform inputs (e.g., the augmented sensor data) into feature vectors that describe one or more properties ("features") of the inputs. The Artificial Intelligence engine may label, classify, and/or categorize the inputs based on the feature vectors. Alternatively or additionally, an Artificial Intelligence engine may use clustering (also referred to as cluster analysis) to identify commonalities in the inputs. The Artificial Intelligence engine may group (i.e., cluster) the inputs based on those commonalities. The Artificial Intelligence engine may use hierarchical clustering, k-means clustering, and/or another clustering method or combination thereof. In various embodiments, an Artificial Intelligence engine includes an artificial neural network. An artificial neural network includes multiple nodes (also referred to as artificial neurons) and edges between nodes. Edges may be associated with corresponding weights that represent the strengths of connections between nodes, which the Artificial Intelligence engine adjusts as Artificial Intelligence proceeds. Alternatively or additionally, an Artificial Intelligence engine may include a support vector machine. A support vector machine represents inputs as vectors. The Artificial Intelligence engine may label, classify, and/or categorizes inputs based on the vectors. Alternatively or additionally, the Artificial Intelligence engine may use a naïve Bayes classifier to label, classify, and/or categorize inputs. Alternatively or additionally, given a particular input, an Artificial Intelligence model may apply a decision tree to predict an output for the given input. Alternatively or additionally, an Artificial Intelligence engine may apply fuzzy logic in situations where labeling, classifying, and/or categorizing an input among a fixed set of mutually exclusive options is impossible or impractical. The aforementioned Artificial Intelligence model and techniques are discussed for exemplary purposes only and should not be construed as limiting one or more embodiments.

In various embodiments, as an Artificial Intelligence engine applies different inputs to an Artificial Intelligence model, the corresponding outputs are not always accurate. As an example, the Artificial Intelligence engine may use supervised learning to train an Artificial Intelligence model. After training the Artificial Intelligence model, if a subsequent input is identical to an input that was included in labeled training data and the output is identical to the supervisory signal in the training data, then output is certain to be accurate. If an input is different from inputs that were included in labeled training data, then the Artificial Intelligence engine may generate a corresponding output that is inaccurate or of uncertain accuracy. In addition to producing a particular output for a given input, the Artificial Intelligence engine may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In embodiments, the platform 100 includes one or more RMAs 130. Each RMA 130 may be associated with a host device (e.g. a delivery bot 160, an end-use client device 150, a centralized resource hub 140, another RMA 130). The RMA 130 may couple with its associated host to move supplies between the RMA and the host device (e.g., from the RMA to the host device, or from the host device to the RMA). In embodiments the supplies moved by the RMA may comprise bulk depletable supplies. In embodiments, the supplies may be bulk containerized supplies, such as fuel cells or batteries containing electrical charge. In embodiments, the RMA 130 may be configured to send data (e.g., geolocation data, Bulk Resource level and use rate data, etc.) to the ROPS 120.

The RMA 130 may include a dock. The dock may be configured to allow the RMA 130 to couple with a host device in order to exchange bulk and/or containerized resources. The dock may include a resource supply interface. The resource supply interface may couple with other devices to exchange the resources.

The RMA 130 may include a bulk storage. The bulk storage may be used to securely retain the bulk resource, or container(s) of the bulk resource. In embodiments, the bulk storage may include one or more storage sensors configured to measures the level or quantity of the bulk resource stored in the bulk storage and/or the rate at which the level or quantity of the resource is changing. The size and/or capacity of the bulk storage may vary.

The RMA 130 may include a communication and information processing component. The communication and information processing component may be configured to provide communications and information processing for the RMA 130. The communication and information processing component may communicate with other devices, including other RMAs, delivery bots, the centralized resource hub, and/or the ROPS. In embodiments, the communication and information processing component may communicate using, for example, Wi-Fi (e.g., IEEE 802.11 protocols), cellular, satellite, etc. over a local network (e.g., a mesh network), and/or over the public internet. The communication and information processing component may be configured to process information from sensors disposed within the RMA (e.g., level measurement from bulk storage, whether docked or not from the dock, etc.), and/or signals to and from the host device through a Host Resource Resupply and Communications Interface.

The RMA 130 may include a host material and communications interface. The host material and communications interface may be configured to couple the RMA 130 with the host device for one/two-way exchange of resources. In some embodiments, the host material and communications interface is configured to facilitate data communication between the RMA 130 and the host device. In embodiments, the host device may be an end-use client device, a delivery bot, and/or a Resource Hub.

Figure 2:
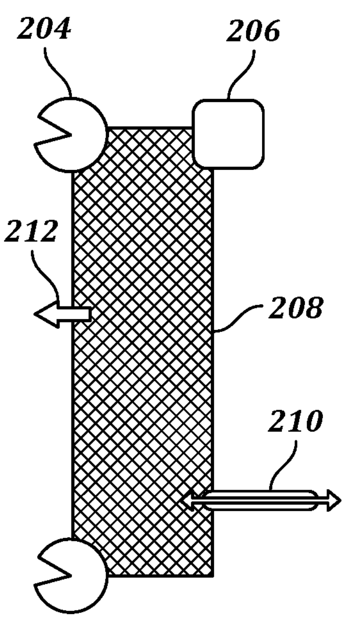
FIG. 2 illustrates an example of a resupply management Assembly (RMA) in accordance with the present disclosure.

The RMA 130 may be configured to facilitate material exchange of bulk resources and/or containerized resources (batteries, ammo cartridges, empty cartridges, etc.). FIG. 2 shows an example configuration 200 of an RMA 202. As shown, the RMA 202 may include a resource supply interface 212 that couples the RMA with other RSA devices or docks (e.g., via a dock 204). In embodiments, a Host Material and Communications Interface 210 may couple the RMA 202 with a host for one-way or two-way exchange of bulk and/or containerized resources, and or communications (e.g., exchange of information) between the RMA 202 and the host.

The coupling may allow for exchange of bulk and/or containerized resources (e.g., stored in a storage area 208) between the RMA 202 and the device (e.g., the RSA or dock) to which the RMA is coupled. The storage area 208 may store bulk and/or containerized resources. In embodiments, the bulk storage area 208 may also measure the level/quantity of the stored resource(s). The size and/or capacity of the storage area 208 may vary within any implementation, and depending at least in part on if the storage area 208 is on a Resource Hub, a Delivery Bot, or and End-Use Client. The host unit may be, for example, an end-use client device, a delivery bot, and/or a Resource Hub. Material exchange may include bulk resources (e.g., electric charge, pellets, etc.) and/or containerized items (e.g., batteries, ammo cartridges, empty cartridges, etc.)

In embodiments, the Host Material and Communications Interface 210 may couple the RMA 202 with the host for one-way or two-way communications (e.g., exchange of information) between the RMA 202 and the host. An RMA Communications and Information Processing Component 206 may provide communications and information processing for the RMA 202 hosted on a delivery bots or on a client device. The RMA Communications and Information Processing Component 206 may communicate with other RMA's, or with the Resource Optimization Processing System using signals such as WiFi, cellular, satellite, etc. The communication may occur over a local (mesh) network, and/or over the public internet. The RMA Communications and Information Processing Component 206 may process information from one or more (e.g., each) sensor (e.g. a level measurement from bulk storage 208, whether docked or not from the dock(s) 204, etc.) on the RMA 202, and/or signals to and from the host through the RSA Resource Resupply Interface 212 and/or the Communications Interface.

Functionality pf the RMA 202 includes resource exchange with a host and/or other resupply units, information processing, and signaling. Embodiments of the RMA 202 may fully encapsulate Resource Management Functions including coupling with Resources Delivery Bots, holding and monitoring bulk and/or containerized resources, and sending data (such as, but not limited to: geolocation, resource level, use rate, etc.) to a Resource Optimization Processing System. In some embodiments, the RMA 202 may be configured to collect resources from the end use client device 150. In turn, the RMA 202 may deposit the collected resources at hub 140. In this way, the RMA and the end use client device 150 can exchange resources bidirectionally. And, further, the RMA and hub 140 may exchange resources bidirectionally.

Returning now to FIG. 1, the supply management platform 100 may include a centralized resource hub 140. In some embodiments, the centralized resource hub 140 may be configured to provide an entry point of the bulk or containerized resource into the system. In some embodiments, the centralized resource hub 140 may be configured to provide an exit point of the bulk or containerized resource out of the system. In some embodiments, the centralized resource hub 140 may include or have a storage for storing the bulk resource and/or the containerized resource. The centralized resource hub 140 may include one or more interfaces configured to receive resources from outside this system. The centralized resource hub 140 may include a dock or other interface configured to couple to an RMA 130 to exchange resources between the RMA and the centralized resource hub.

The supply management platform 100 may include one or more end use client devices 150. In some embodiments, the end use client device 150 may be configured to use the bulk or containerized resource that the system manages. For example, the end use client device 150 may be and agricultural robot distributing a resource (e.g., food, water, fertilizer, pesticide, and/or the like), a sensing device, a construction robot, an armed sentry, a warehouse inventory picker, and/or the like. In some embodiments, the end use client device 150 may be configured to generate or collect the bulk or containerized resource that the system manages. For example, the end use client device 150 may be an agricultural robot configured to harvest a resource, a factory robot configured to produce a resource, and/or the like. In some embodiments, the end use client device may be mobile, including one or more means of propulsion, such as wheels, tank treads, propellers, and/or the like.

The supply management platform may include a delivery robot 160. The delivery robot 160 may be a mobile autonomous device configured to move resources from the RMAs to a location included in a command from the ROPS 120. The delivery robot 160 may be mobile, including one or more means of propulsion, such as wheels, tank treads, propellers, and/or the like. In some embodiments, the delivery robot may include a data and material interface configured to facilitate exchange of data and/or resources between the delivery bot and the RMA. In some embodiments, the delivery robot may consume resources from the RMA(s).

Figure 3:
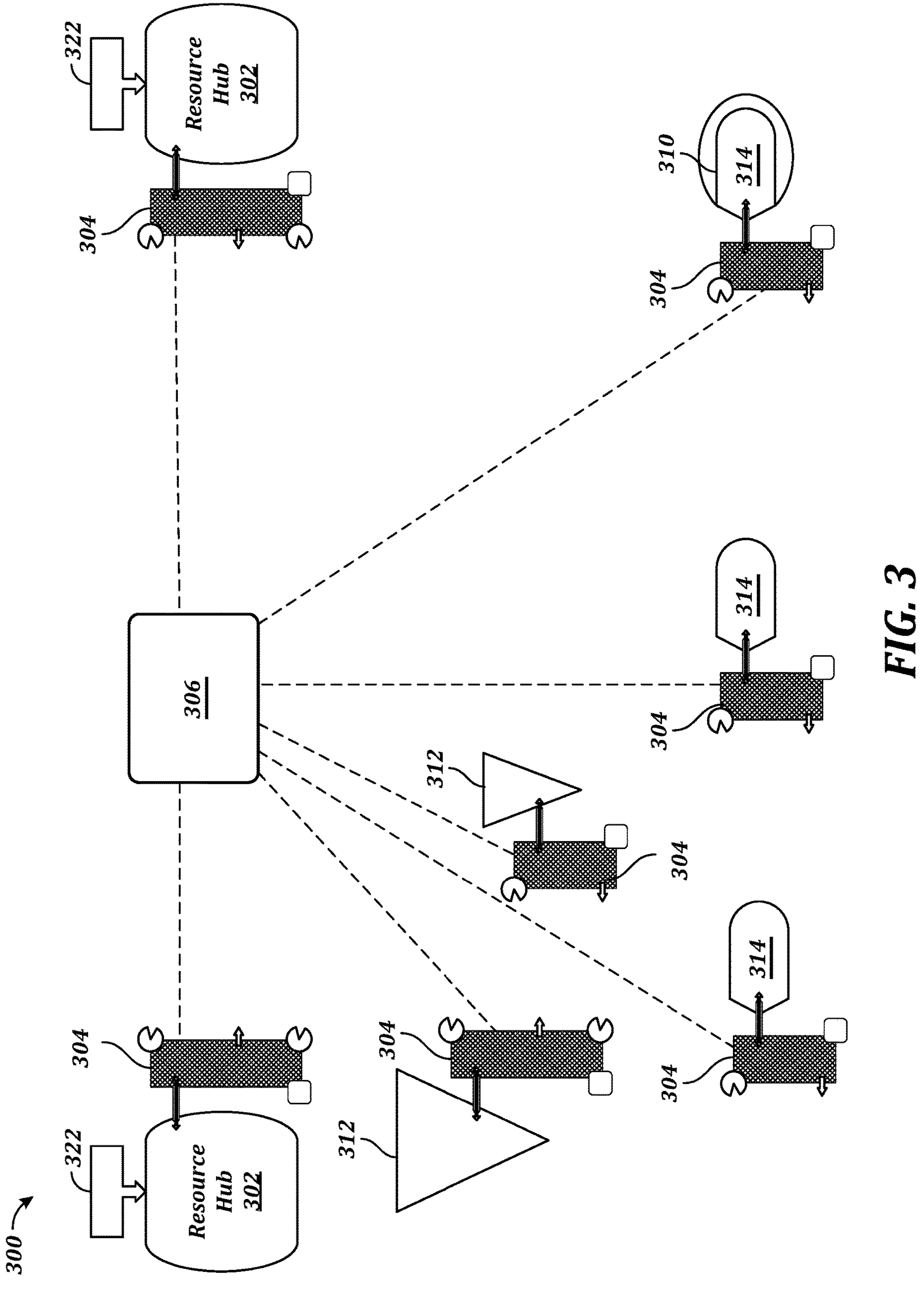
FIG. 3 illustrates a first example platform consistent with the operating environment shown in FIG. 1.
Figure 4:
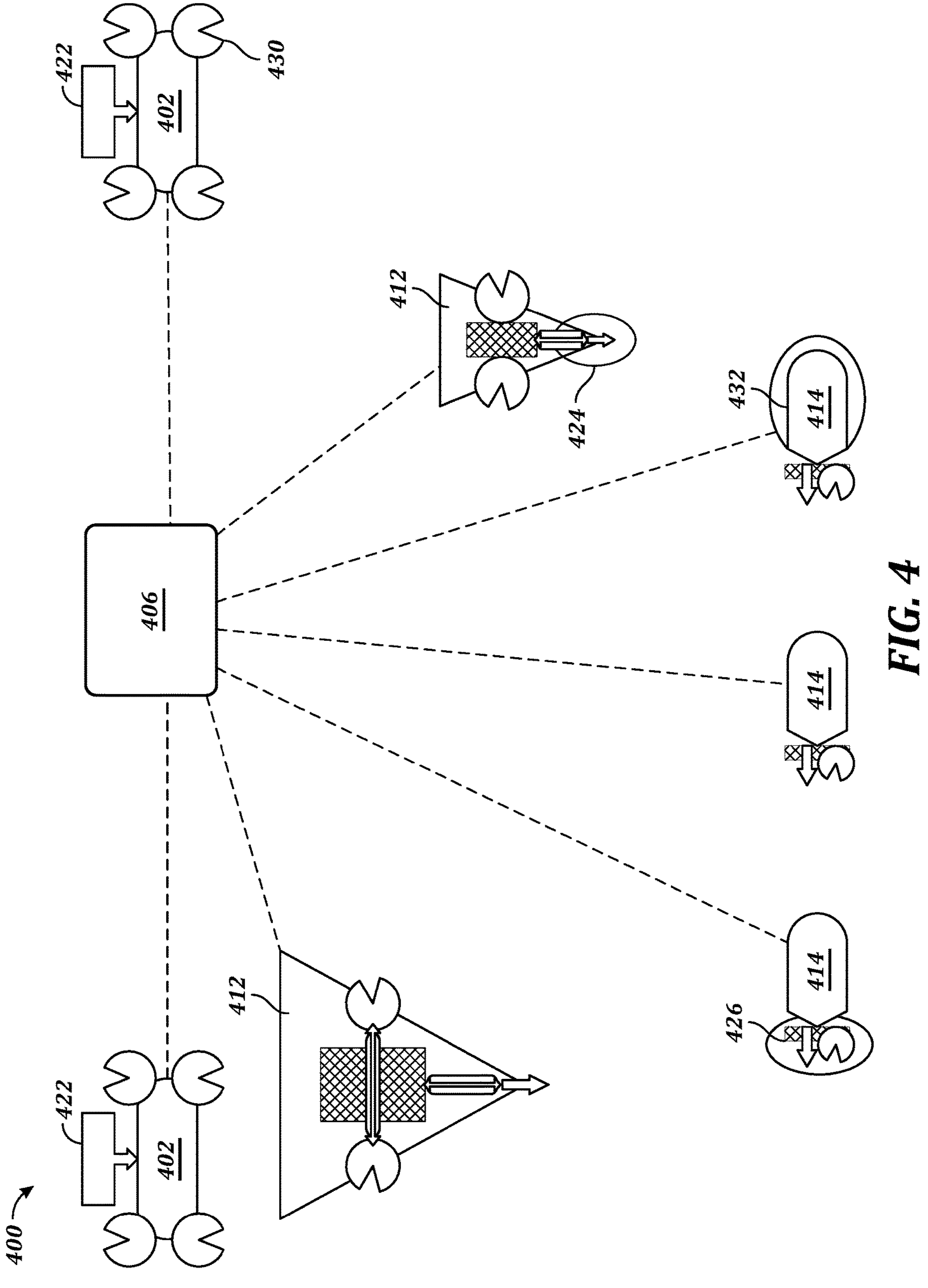
FIG. 4 illustrates a second example platform consistent with the operating environment shown in FIG. 1.

FIGS. 3 and 4 show example embodiments of a resupply management platform in accordance with FIG. 1.

FIG. 3 shows a first example resupply management platform 300, including one or more resource hubs 302, a plurality of Resupply and Storage Units 304, and a Resource Optimization Processing System (ROPS) 306. One or more (e.g., each) resource hub 302 may provide an entry point 322 of bulk and/or containerized resource into the platform 300. The resource hub 302 may include a storage area, or may fully outsource storage to one or more resupply and storage units 304 coupled thereto. In embodiments, the resource hub 302 may have an interface to facilitate receiving supply material from outside this system (e.g., via the entry point 322).

Each resupply storage unit 304 may couple with an associated host (e.g., a resource hub 302, a delivery bot 312, an end-use client device 310 a client device 314 etc.) and/or with other resupply and storage units. The resupply storage unit 304 may receive bulk and/or containerized resources. Functionality of the resupply storage unit 304 may include resource exchange with the host and/or the other resupply units, information processing, and signaling. In some embodiments, the resupply and storage unit 304 may fully encapsulate resource management functions including coupling with resource delivery bots, holding and monitoring bulk and/or containerized resources, and/or sending data (e.g., geolocation, resource level and/or use rate, etc.) to the ROPS 306.

The ROPS 306 may send command signals to one or more resource delivery bots 312. The signals may specify, for example, the route to take, the order in which client devices 314 should be resupplied, and the quantity of each resupply, and/or the like. The ROPS 306 uses data gathered on locations of one or more client devices 314, prioritization configuration, route configuration, etc. to create the signals to the delivery bots 312. In some embodiments, the ROPS 306 may further gather signals related to resource levels and/or use rates at one or more (e.g., each) resupply and storage unit 304 to optimize or improve resource availability and distribution.

Delivery may be provided from a resource hub 302 to one or more client devices 314 via one or more delivery bots 312 based on instructions from the ROPS 306. In embodiments, one or more (e.g., each) delivery bot 312 may be a mobile autonomous device having a primary purpose of delivering resources to where the ROPS 306 directs the delivery bot. The delivery bot 312 may consume at least a portion of the resources to be delivered. The one or more client device 314 may include at least one end use client device 310. The end-use client device 310 may be a particular kind of client device 314. For example, the end use client device 310 may use the bulk and/or containerized resources (e.g., charge, ammunition container(s), etc.) that the platform 300 ultimately services and/or replenishes. As particular examples, the end use client device 310 may be an agricultural robot, a sensing device, a construction robot, an armed sentry, a warehouse inventory picker, etc.

FIG. 4 shows a second example resupply management platform 400, including one or more resource hubs 402, a Resource Optimization Processing System (ROPS) 406, one or more delivery bots 412, and one or more client devices 414. The platform 400 may further include at least one resupply storage unit 424. However, the functions of the resupply storage unit 424 may not be fully assembled/encapsulated in a single device. Some of those functions may be provided externally by the client device 414, the resource hub 402, and/or the delivery bot 412.

One or more (e.g., each) resource hub 402 may provide an entry point 422 of bulk and/or containerized resource into the platform 400. The resource hub 402 may include a storage area. In embodiments, the resource hub 402 may have an interface to facilitate receiving supply material from outside this system (e.g., via the entry point 422). In some embodiments, the resource hub 402 may include a dock 430 that allows a resource delivery bot 412 to couple with the resource hub to transfer resources between the hub and the delivery bot.

The ROPS 406 may send command signals to the delivery bots 412. The signals may specify, as non-limiting examples, the route to take, the order of client devices 414 to resupply, and/or the quantity of the resupply. The ROPS 406 may use data gathered on client device locations, prioritization configuration, route configurations. resource levels, resource use rates, and/or the like to optimize or otherwise improve resource availability and distribution.

At least one resource delivery bot 412 may include a resource resupply interface 424. The resource resupply interface 424 may couple the delivery bot 412 with a dock of another resource delivery bot and/or the resource hub 402 to facilitate receipt of bulk and/or containerized resources. Some embodiments of the resource resupply interface 424 may fully encapsulate various resource management functions including, but not limited to, coupling with other resource delivery bots, holding and monitoring resources, sending data (e.g., geolocation, resource level and use rate, etc.), to the ROPS 406, and/or the like.

The one or more client device 414 may include at least one end use client device 432. The end-use client device 432 may be a particular kind of client device 414. For example, the end use client device 432 may use the bulk and/or containerized resources (e.g., charge, ammunition container (s), etc.) that the platform 400 ultimately services and/or replenishes. As particular examples, the end use client device 432 may be an agricultural robot, a sensing device, a construction robot, an armed sentry, a warehouse inventory picker, etc.

The resupply storage unit 426 may couple with a client device 414. In embodiments, the resupply storage unit 426 may further couple with a dock in a resource delivery bot 412 or the resource hub 402 to facilitate receipt of bulk and/or containerized resources at the client device 414. In some embodiments, the resupply storage unit 426 may hold and/or monitor resources. Additionally or alternatively, some embodiments of the resupply storage unit 426 may send data (e.g., geolocation, resource level and use rate, etc.) to the ROPS 406.

III. Platform Operation

Figure 5:
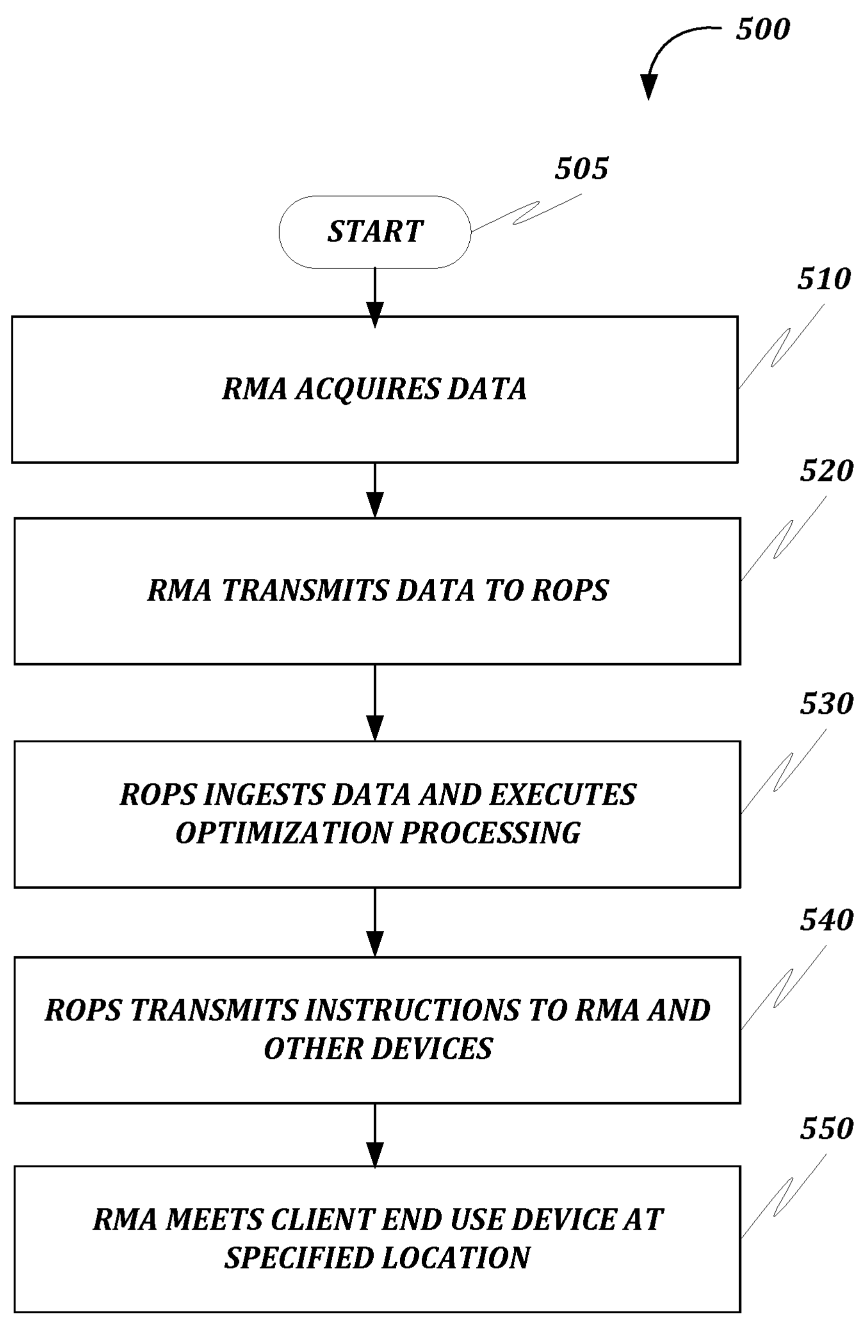
FIG. 5 is a flow chart of a method for providing a resupply management platform.

FIG. 5 is a flow chart setting forth the general stages involved in a method 500 consistent with various embodiments of the disclosure for operating the resource management platform 100. Method 500 may be implemented using the platform 100, as shown in FIG. 1.

Although method 500 has been described to be performed by platform 100, it should be understood that computing device 1000 may also be used to perform various stages of method 500. Furthermore, in some embodiments, different operations may be performed by different networked elements in operative communication with computing device 1000. For example, server 110, ROPS 120, RMA 130, centralized resource hub 140, end use client device 150, and/or delivery robot 160 may be employed in the performance of some or all of the stages in method 500.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 500 will be described in greater detail below.

Method 500 may begin at starting block 505 and proceed to stage 510 where an RMA (e.g., RMA 130) in a resource management platform may acquire data. As a particular example, the RMA may acquire sensor data from one or more sensors disposed in the RMA. For example, the sensors may detect a geographic location of the RMA, a level or quantity of the bulk resource stored in the bulk storage, a rate at which the level or quantity of the resource is changing, and/or a coupling state of the RMA (e.g., whether the RMA is docked to a host device and/or a type of host device to which the RMA is docked). As further examples, the acquired data may include diagnostic data related to the RMA, and/or diagnostic data related to a host device associated with the RMA (e.g., a device to which the RMA is docked or otherwise coupled). In some embodiments, the RMA may sense proximity of one or more other devices (e.g., other RMAs, end use client devices, etc.) in the platform. For example, the RMA may sense a proximity of the other devices using a visual sensor (e.g., a camera), lidar, radar, a received signal strength indicator (RSSI), sonar, and/or the like. There are many types of data that the RMA may sense using various sensors of the RMA.

In some embodiments, the acquired data may include data received from other devices (e.g., other RMAs, client end use devices, etc.) in the platform. For example, the RMA may communicate with one or more other devices to receive the data collected from the sensors in the other devices (e.g., resource level, position, coupling state, diagnostics, etc.). The RMA may relay the data received from the other devices using a wireless network, such as a mesh network, so that the data may propagate through the platform.

In some embodiments (e.g., when the RMA is coupled to a host device), the RMA may acquire data from the host device. For example, the RMA may receive data from the host device indicating a position to which the host device is moving, a time constraint for moving to the position, host device diagnostic data (e.g., data indicating a flat tire on the host device), and/or any other data associated with the host device (e.g., dimensions, performance ratings, capacities, sensor data from the host, etc.).

Following the RMA acquiring data in stage 510, the method 500 may proceed to stage 520, where the RMA transmits data to a ROPS (e.g., the ROPS 120). In embodiments, the data transmitted from the RMA to the ROPS may include at least a portion of the data acquired by the RMA in stage 510 (e.g., sensor data, diagnostic data, data received from a host associated with the RMA, and/or data received from other devices). In some embodiments, the data transmitted from the RMA to the ROPS may include additional data, such as telemetry data, metadata associated with the RMA and/or metadata associated with the host (e.g., a unique identifier, a capacity, dimensions, performance ratings, a group identifier, and/or one or more operational constraints) and/or metadata associated with the transmission. In some embodiments, the data transmitted from the RMA to the ROPS may include a device type associated with the host device to which the RMA is coupled. For example, the device type may be primarily delivery robot, primarily end-use device, etc.

The RMA may transmit the acquired data to the ROPS using, for example, Wi-Fi (e.g., IEEE 802.11 protocol) signals, cellular signals, satellite communication signals, and/or other forms of wireless communication. The data may be transmitted to the ROPS via a network, such as a local network (e.g., a mesh network) and/or the public internet. In some embodiments, the mesh network used to transfer data may be a network facilitated by the plurality of devices included in the platform 100 (e.g., the one or more RMAs, the one or more end use client devices, the ROPS, etc.).

Following transmission of the data from the RMA to the ROPS in stage 520, the method 500 may proceed to stage 530, where the ROPS ingests the transmitted data. In embodiments, ingesting the transmitted data may include encapsulating the received data. In some embodiments, the ROPS may add metadata (e.g., a timestamp) to the received data. In some embodiments, the ROPS may store the data at a data store. The data store may be local to the ROPS or a remote data store with which the ROPS can communicate.

In embodiments, the ROPS ingest of the received data may include applying optimization processing to the received data to determine one or more commands for the RMA. Optimization processing may include applying one or more artificial intelligence or Artificial Intelligence models to the received data. In some embodiments, the artificial intelligence or Artificial Intelligence model may be applied locally (e.g., at the ROPS). Additionally or alternatively, the data may be transmitted to a separate device, which may apply the Artificial Intelligence model. Additionally or alternatively, the ROPS may transmit the artificial intelligence or Artificial Intelligence model to each of the RMAs present in the platform, which may independently apply the model.

In some embodiments, the optimization processing may include processing received data with configuration data maintained by the platform. For example, the configuration data may include a prioritization of end-use clients, such as a particular priority among end use client devices and/or prioritizing end use client devices over other devices within the platform 100. The configuration data may include objective definition for optimization. For example, optimization may include maximizing resource uptime (e.g., minimizing time during which hosts are without resources from their RMAs), maximizing a weighted host resource uptime, maximizing a host ability to achieve a particular task or mission, maximizing robustness or resiliency (e.g., reducing mean time between failures, maximizing coverage), minimizing distances traveled by RMAs and/or end use client devices, maximizing resource usage at the end use client devices, etc. There are many different objectives of the platform that could be optimized. The configuration data may include topology data for routes of the various devices that make up the platform (e.g., defining what routes allowable, not allowable, weights on particular routes or sections, etc.). The configuration data may include additional data for use in prioritization (e.g. geography, use rate of resources, etc.). In some embodiments, configuration data may include geographic boundaries of a theater of operation of the platform. The configuration data may include information indicating a use type of a device. While the above configuration data is a representative example of configuration data that may be used by the platform, those of skill in the art will recognize that additional and/or different configuration data may be used by the platform as part of the data ingest and optimization processing.

As a particular example, a goal of the optimization processing may include determining an optimal path for the RMA. Different optimization conditions may be considered to determine optimality. For example, optimization may take into account distance to be traveled by the RMA, downtime of one or more client end use devices, distance to be traveled by the one or more client end use devices, route topology (e.g., certain locations may be inaccessible by or more difficult to get to for one or more of the host devices coupled to the RMAs).

In some embodiments, the optimization processing algorithm (e.g., an artificial intelligence algorithm, Artificial Intelligence algorithm, and/or neural network) may be trained using a simulation and a training set of data. In some embodiments, the trained algorithm may be transmitted to the ROPS and/or the RMAs. In other embodiments, the trained algorithm may be stored at a computing device in communication with the ROPS and/or the RMAs. In some embodiments, the optimization processing algorithm may be performed locally on the RMA. In other embodiments, the optimization processing algorithm may be performed remotely, relative to the RMA. For example, the optimization processing algorithm may be performed at the ROPS or at another computing device (e.g., a single computing device or a cloud device) in communication with the RMA. Data output from the optimization processing algorithm may be returned to the RMA. Moreover, the optimization processing algorithm may be updated based on the input, with updates being pushed to the location where the optimization processing algorithm is stored (e.g., the RMA, the ROPS, or a computing device in communication with the RMA and/or ROPS).

In embodiments the ingest may include providing, as inputs, data associated with the RMA (e.g., at least a portion of the data received from the RMA). The output of the optimization processing may be one or more commands for the RMA to provide an optimal route for the RMA based on selected optimization conditions. The one or more commands may include, for example, commands that specify a location to which the RMA should move, a host device to which the RMA should couple to effect the instructed move, a route the RMA should take to effect the instructed move, one or more devices with which the RMA should dock to exchange resources, and/or a quantity of resources to be exchanged.

In some embodiments, the optimization processing may further include receiving information from additional devices, such as one or more of the delivery robots and/or one or more of the client end use devices. For example, the optimization process may receive geographic locations of the one or more of the delivery robots and/or one or more of the client end use devices, coupling status of the one or more of the delivery robots and/or one or more of the client end use devices (e.g., whether or not each device is currently coupled to an RMA). In embodiments, the output of the optimization processing may include one or more commands for one or more of the additional devices. For example, the one or more commands may specify a location to which the device is to move, an RMA to which the device should couple, a route the device should take to reach the instructed location.

After ingesting the data and performing the optimization processing at step 530, the method 500 may proceed to stage 540, where the ROPS can transmit the instructions output by the optimization processing to the RMA and/or the additional devices. The ROPS may transmit the instructions to the RMA and/or the additional devices using, for example, Wi-Fi (e.g., IEEE 802.11 protocol) signals, cellular signals, satellite communication signals, and/or other forms of wireless communication. The commands may be transmitted via a network, such as a local network (e.g., a mesh network) and/or the public internet. In embodiments, the commands may include, for example, a particular location to which the RMA should move, a route for moving the RMA from a present location to the particular location, a particular end use client device with which the RMA should exchange resources, and/or how much of the resource should be exchanged. In some embodiments, the commands may include additional or alternative commands.

Following transmission of the commands in stage 540, the method 500 may proceed to step 550, where the RMA meets the client end use device at the location included in the commands. In some embodiments (e.g., where the location included in the commands corresponds to the location of the client end use device), the RMA and the client end use device meeting may include the RMA moving to the location, while the client end use device does not move. In some embodiments (e.g., where the location included in the commands corresponds to the location of the RMA), the RMA and the client end use device meeting may include the RMA remaining at the location and waiting for the end use client device to arrive at the location. In still other embodiments, the RMA and the client end use device meeting may include both the RMA and the client end use device moving to the location.

In some embodiments, where the RMA is currently coupled to a host device, the RMA may move to the location included in the commands by providing at least a portion of the commands to the coupled host device. The provided portion of the commands may cause the host device to move to the location included in the commands, Alternatively, where the RMA include a means of locomotion (e.g., wheels, treads, propeller blades, etc.) proceeding to the location may include the RMA moving directly to the location specified in the commands.

In some embodiments, the commands may include a specific location (e.g., particular GPS coordinates, particular latitude and longitude coordinates), a broad location (e.g., an area of a field), a location relative to one or more other devices, or the like. In some embodiments, the commands may include routing information specifying a particular route for the RMA to take to get to the location.

After the RMA and the client end use device arrive at the location included in the received instructions, the RMA and the client end use device may perform a handshake process to mutually verify identities of the devices. For example, the RMA ad the client end use device may use the Challenge Handshake Authentication Protocol (CHAP). Following establishment of a connection between the RMA and the client end use device, the authenticator (e.g., one of the RMA and the client end use device) may send a challenge message to the peer (e.g., the other of the RMA and the client end use device). The peer may respond with a calculated value based on applying a hash function to the challenge message and a secret value known to both the authenticator and the peer. The authenticator may apply the hash function to the challenge message and the secret to calculate an expected hash value, and may check the response from the peer against the calculated expected hash value. If the value received from the peer matches the expected hash value, the authenticator acknowledges the authentication; otherwise the authenticator may terminate the connection.

Following a successful authentication, the RMA may determine that the end use client device is a target to which the RMA should be coupled. The RMA may couple itself to the client end use device. For example, a bulk storage compartment of the RMA may be mechanically coupled to a storage compartment of the client end use device such that resources (e.g., bulk resources) may be moved between the storage compartment of the RMA and the storage compartment of the client end use device. In embodiments, the RMA and the client end use device may exchange resources therebetween. For example, one or more resources may be moved from the RMA to the client end use device and/or one or more resources may be moved from the client end use device to the RMA. FIGS. 6-9B show example data flows in accordance with the method 500.

Figure 6:
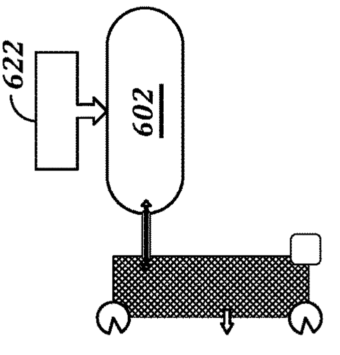
FIG. 6 is a first example data flow from an End-Use Client device based on the method of FIG. 5.
Figure 6:
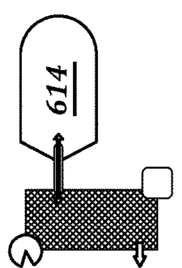
Figure 6:
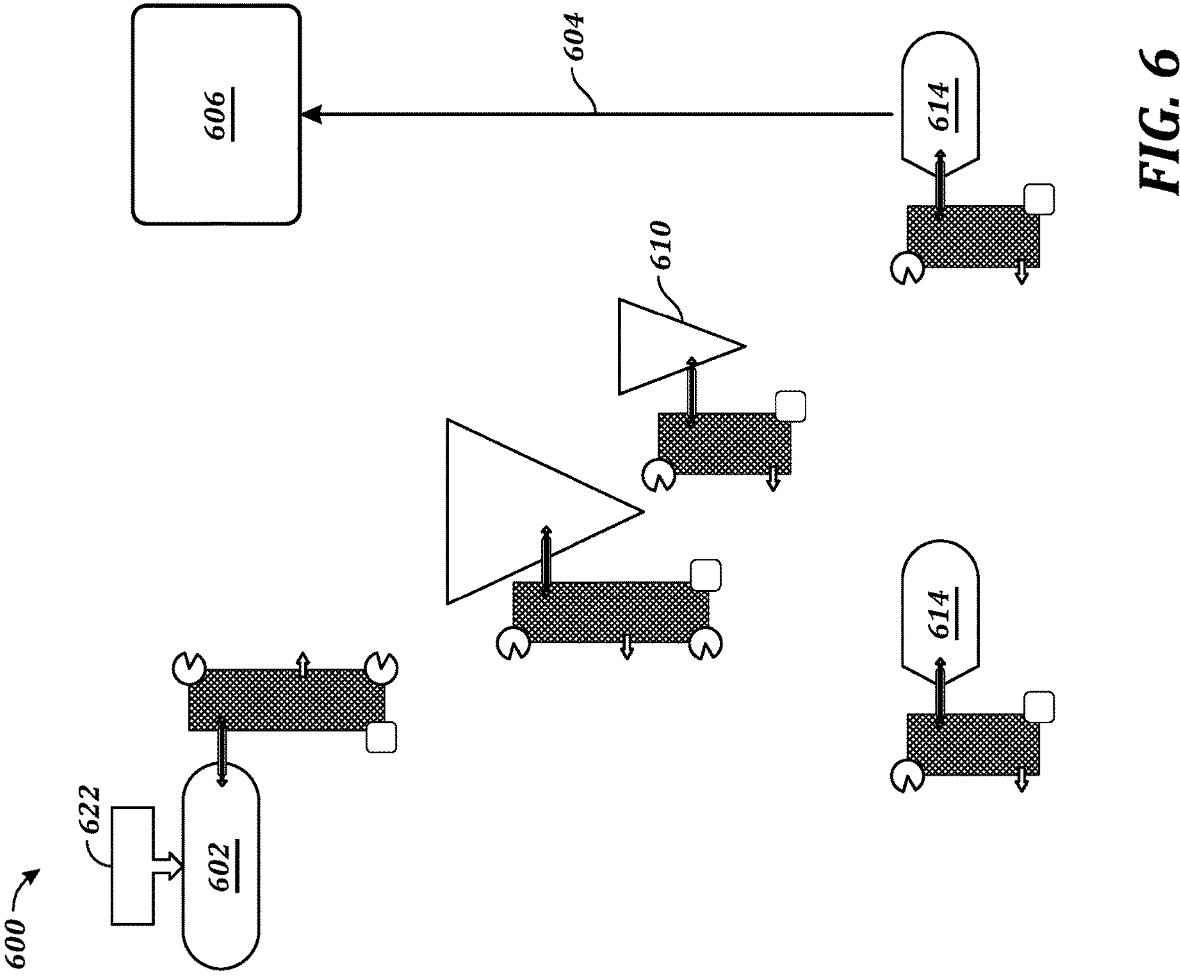

As shown in FIG. 6, a platform 600 may include one or more resource hubs 602 receiving resources at the resource entry point 622, a Resource Optimization Processing System (ROPS) 606, one or more delivery bots 610, and one or more client devices 614. Data 604 may flow from at least one client device 614 to the ROPS 606. The data 604 may include, as non-limiting examples, a quantity or level of a resource in storage, a rate of use of the resource, a geolocation of the client device 614, a coupling state of the client device (e.g., whether or not an RMA is coupled to the client device), diagnostic information associated with the client device and/or an RMA coupled to the client device, telemetry data, metadata, etc.

Figure 7:
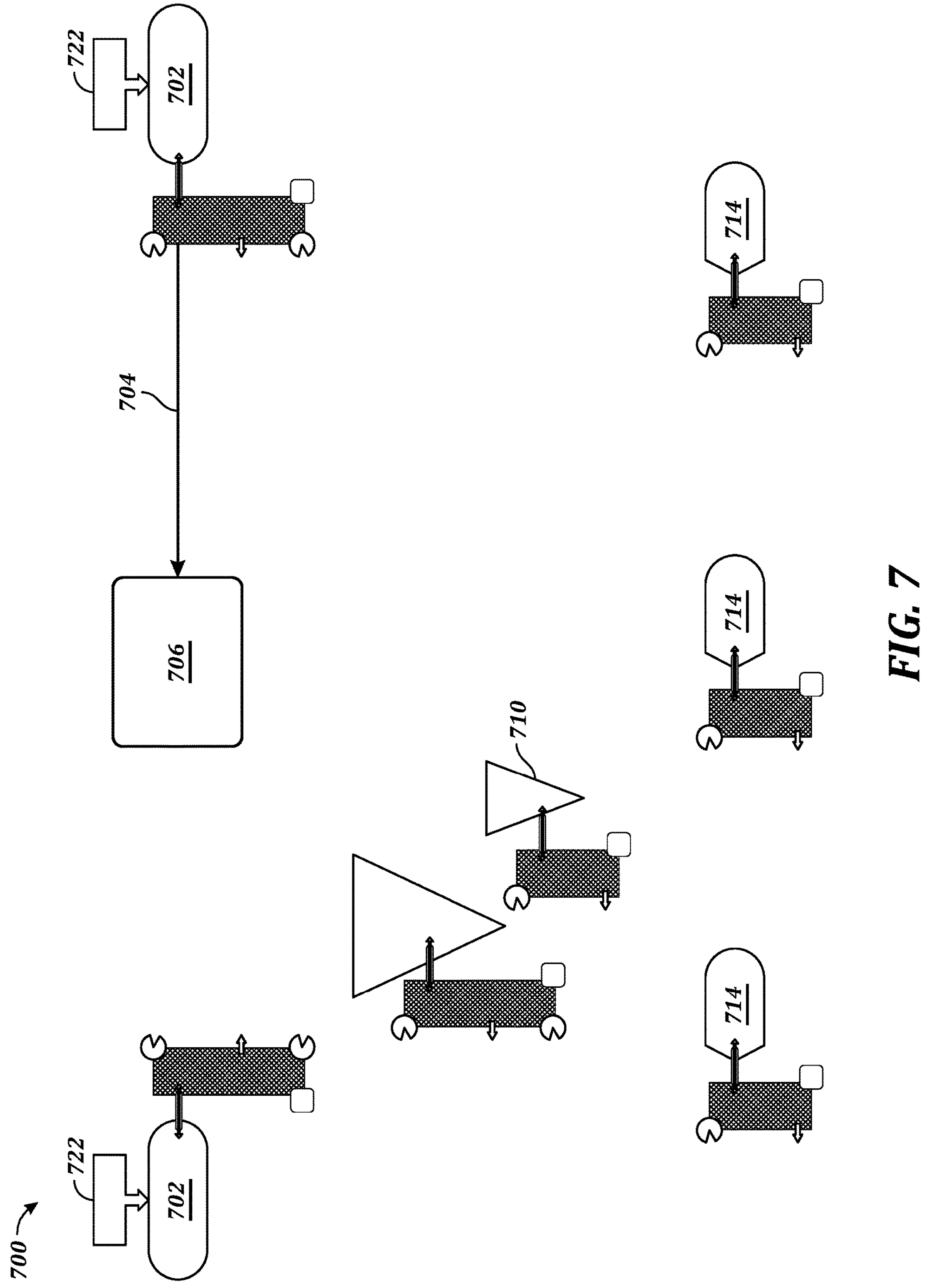
FIG. 7 illustrates a second example data flow from a Resource Hub device based on the method of FIG. 5.

As shown in FIG. 7, a platform 700 may include one or more resource hubs 702 receiving resources at the resource entry point 722, a Resource Optimization Processing System (ROPS) 706, one or more delivery bots 710, and one or more client devices 714. Data 704 may flow from at least one resource hub 702 to the ROPS 706. The data 704 may include, but need not be limited to, a quantity or level of a resource in storage at the resource hub 702, a rate of use of the resource, a geolocation of the resource hub, a coupling state of the resource hub (e.g., whether or not an RMA is coupled to the resource hub), diagnostic information associated with the resource hub and/or an RMA coupled to the resource hub, telemetry data, metadata, etc.

Figure 8:
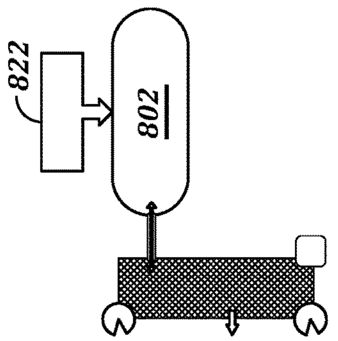
FIG. 8 illustrates a third example data flow from a Delivery Robot device based on the method of FIG. 5.
Figure 8:
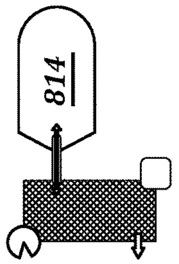
Figure 8:
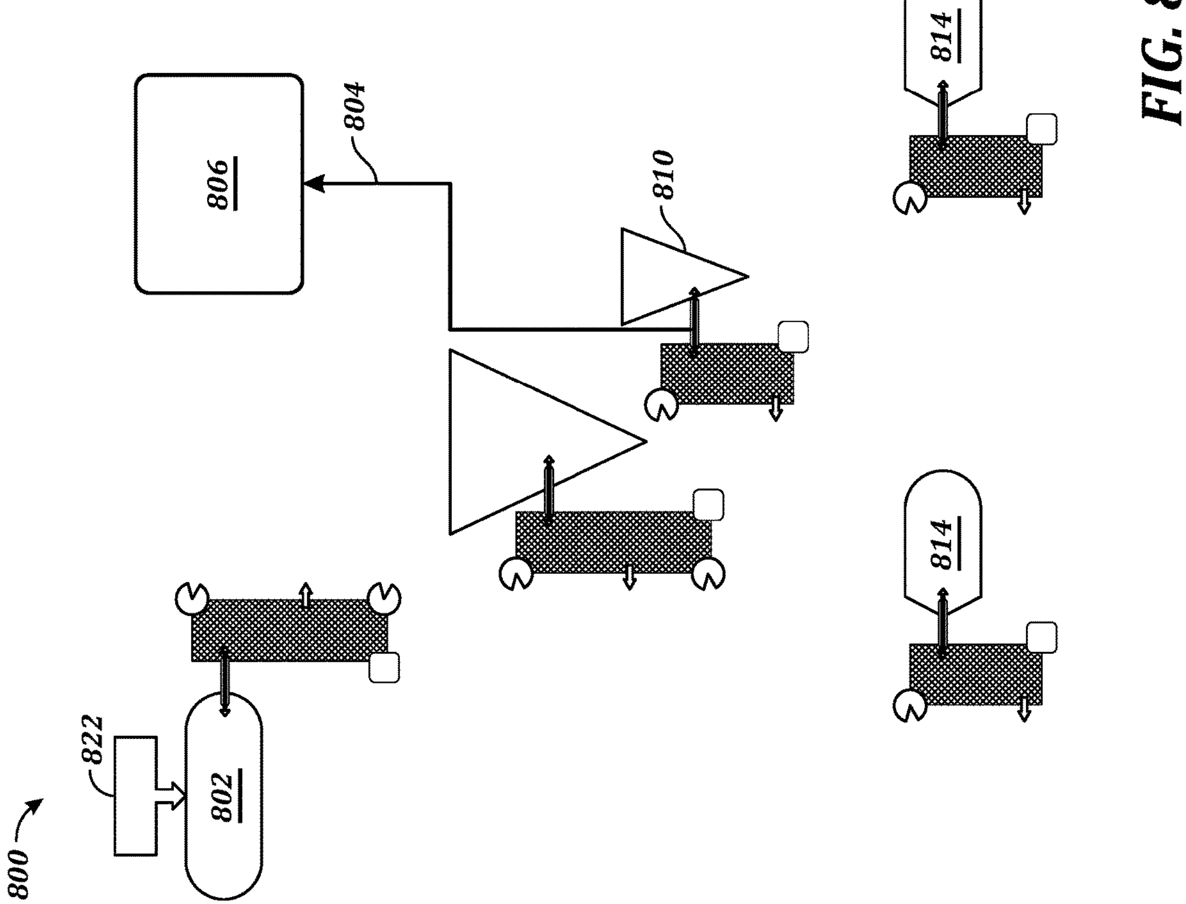

As shown in FIG. 8, a platform 800 may include one or more resource hubs 802 receiving resources at the resource entry point 822, a Resource Optimization Processing System (ROPS) 806, one or more delivery bots 810, and one or more client devices 814. Data 804 may flow from at least one delivery bot 810 to the ROPS 806. The data 804 may include, but need not be limited to, a quantity or level of a resource in storage at the delivery bot 810, a rate of use of the resource, a geolocation of the delivery bot, a coupling state of the delivery bot (e.g., whether or not an RMA is coupled to the delivery bot), diagnostic information associated with the delivery bot and/or an RMA coupled to the delivery bot, telemetry data, metadata, etc.

Figure 9A:
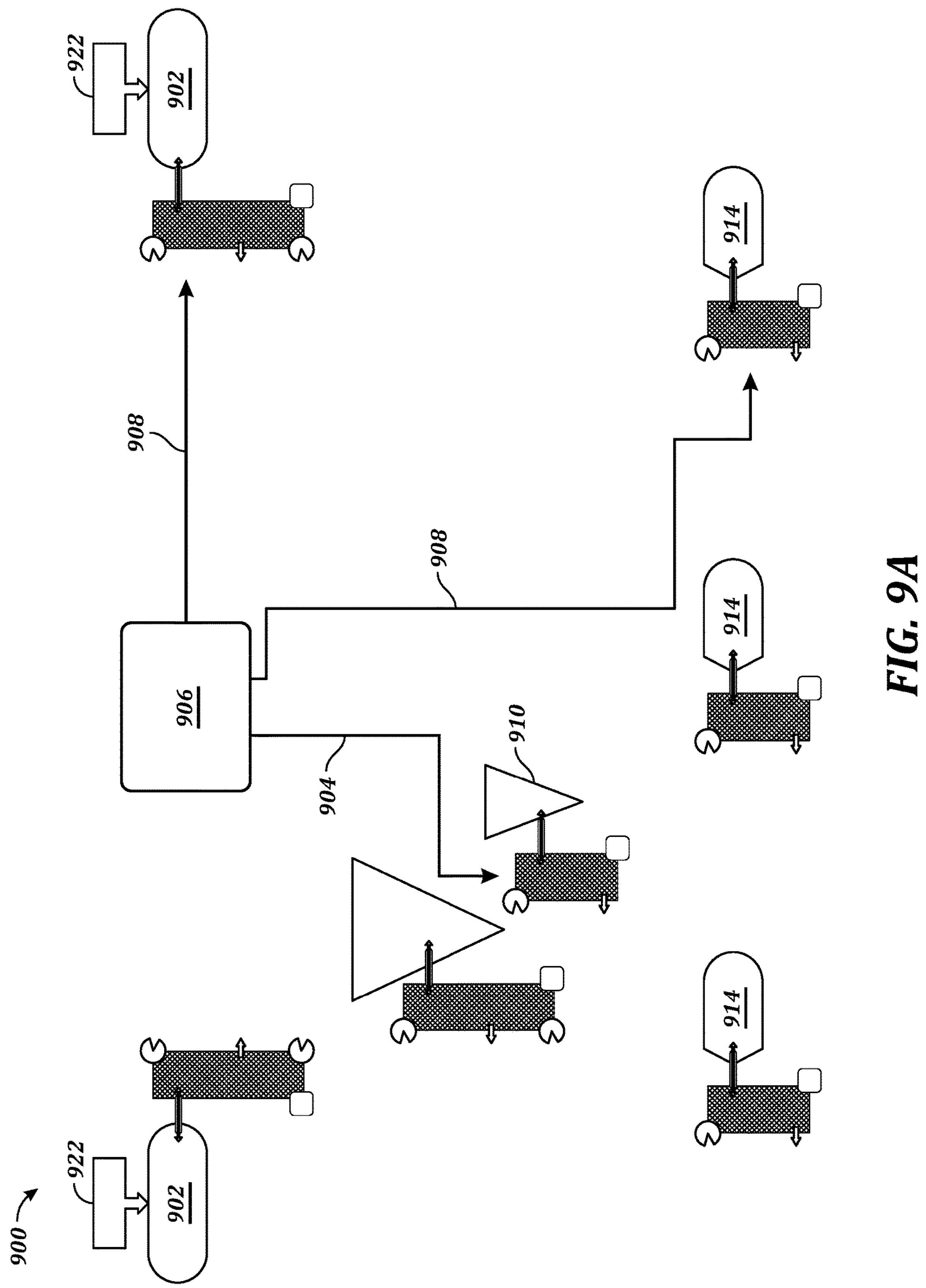
FIG. 9A illustrates a fourth example data flow from a resource optimization processing system (ROPS) device to one or more RMAs or Delivery Robots based on the method of FIG. 5.

As shown in FIG. 9A, a platform 900 may include one or more resource hubs 902 receiving resources at the resource entry point 922, a Resource Optimization Processing System (ROPS) 906, one or more delivery bots 910, and one or more client devices 914, and/or to an RMA coupled to any of these devices. The ROPS 904 may transmit data to the one or more resource hubs 902, the one or more delivery bots 910, and/or the one or more client devices 914. The data 904 transmitted from the ROPS 906 to the Delivery Bot 910 may include, as non-limiting examples, where to go (e.g., destination geolocation information), what to dock with (e.g., a destination device identifier), how much to supply/exchange (e.g., an amount of resource to exchange), and/or what route to take (e.g., routing and/or pathing information). The data 908 may be transmitted from the ROPS 906 to the client device 914 and/or the resource hub 902. In embodiments, the data 908 may include, but need not be limited to: where to go (e.g., destination geolocation information) for a mobile resource hub 902 and/or client device 914; what to dock with (e.g., a device identifier of a device with which to exchange resources); how much to supply/exchange (e.g., an amount of resource to exchange), and/or what route to take (e.g., routing and/or pathing information).

Figure 9B:
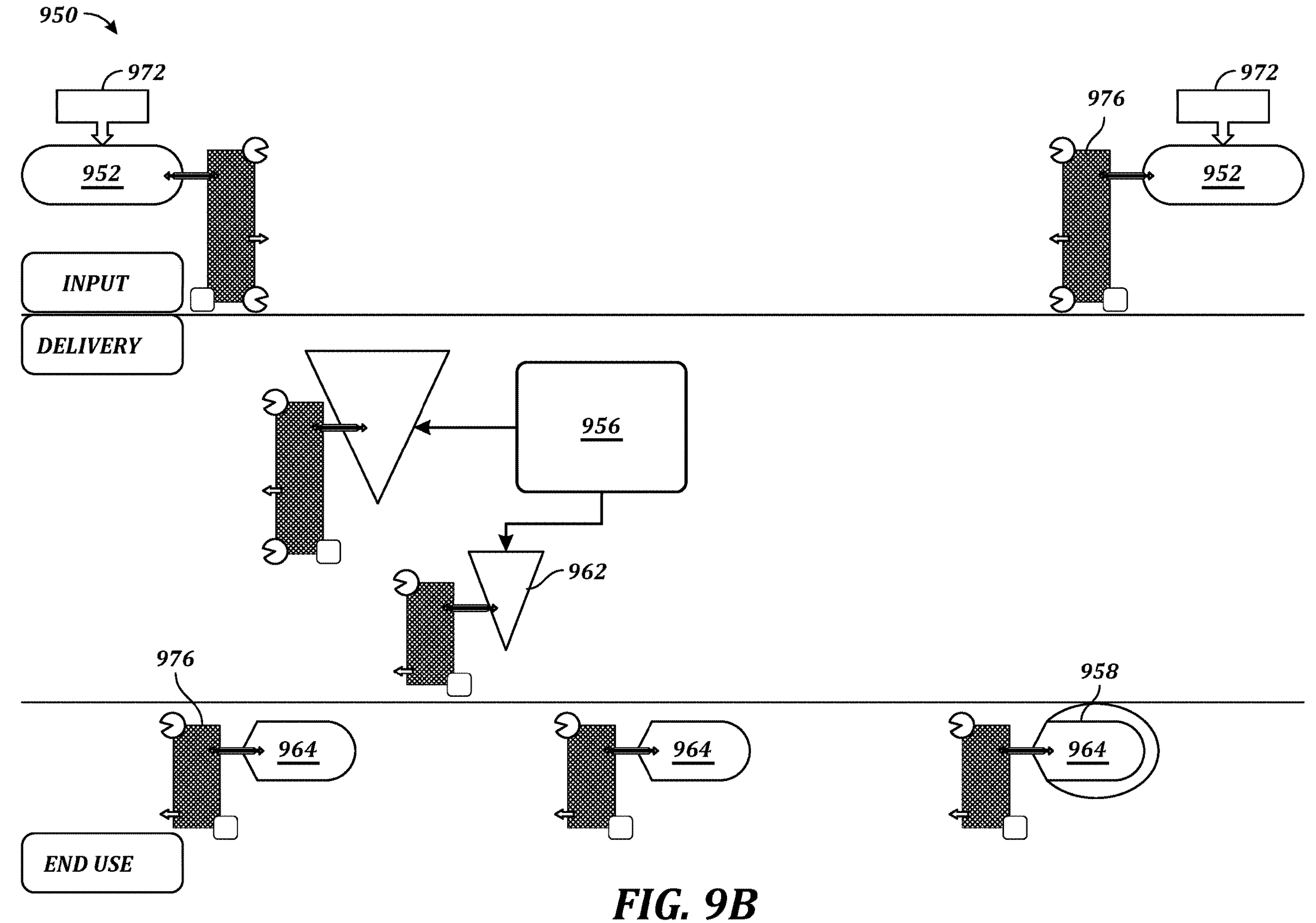
FIG. 9B illustrates an alternative fourth example data flow.

FIG. 9B shows a flow for a platform 950. A resource hub 952 may provide an entry point for bulk and/or containerized resources into the platform 950 from outside of the platform. For example, the resource hub 952 may receive resources via an entry point 972. The resource hub 952 may have a storage, or may fully outsource storage to one or more resupply and storage units 976. In embodiments, the resources may be embodied as resupply management assemblies (e.g., fully encapsulated resupply and storage units 976).

A Resource Optimization Processing System (ROPS) 956 may interface with a remote Artificial Intelligence model and/or run an Artificial Intelligence model locally on one or more RMA's. In this configuration, each RMA may have an onboard processor capable of running the Artificial Intelligence model. Each RMA may make decisions based on its local data and/or data shared on the network from other RMAs and end use client devices.

A delivery bot 962 may be a mobile autonomous device with a primary purpose of delivering resources (e.g., the Resupply Management Assemblies) to where the ROPS 956 directs the delivery bot to go. The delivery bot 962 may contain a data and material interface for the RMA(s). In some embodiments, the delivery bot 962 may consume resources from the RMA(s).

An end use client device 964 may ultimately use the bulk and/or containerized resources that the platform 950 services/replenishes (e.g., via the one or more delivery bots 962). In some embodiments, the end use client device 964 may be, for example, an agricultural robot, a sensing device, a construction robot, an armed sentry, a warehouse inventory picker, etc.

The platform 950 may further include on or more resupply and storage units 976. The resupply and storage unit 976 may couple with its host (e.g., a resource hub 952, a delivery bot 962, an end-use client device 964) and/or with other Resupply and Storage Unit(s) (e.g., the dock in a delivery bot 962 or a resource hub 952) in order to receive resources. Functionality of the resupply and storage units 976 may include resource exchange with a host and/or other resupply units, information processing, and/or signaling. Embodiments of the resupply and storage units 976 may fully encapsulate resource management functions, including coupling with a resource delivery bot 962, holding and monitoring resources, and/or sending data (e.g., geolocation, resource level and/or use rate, etc.) to the ROPS 956.

In some embodiments, the ROPS would use an Artificial Intelligence model running on a centralized server or cloud-based system (centralized approach). All RMAs and end use client devices would send their data to this central processor, which would analyze the data, make decisions, and then send instructions back to the RMAs and end use client devices.

In other embodiments, the ROPS Artificial Intelligence model may run locally on multiple RMA's (decentralized approach). In this configuration, each RMA would have its own onboard processor capable of running the machine Artificial Intelligence model. Each RMA would make decisions based on its local data and potentially data shared on the network from other RMAs and end use client devices.

In other embodiments, the ROPS Artificial Intelligence model may run both could combine both centralized and decentralized processing, and run AI models locally on multiple RMA's as well as on centralized servers or cloud-based systems. For example, basic, time-sensitive decisions could be made locally on the RMA, while more complex analyses or decisions that require a broader view of the system could be offloaded to central servers or cloud-based systems.

IV. Platform Architecture

Embodiments of the present disclosure provide a hardware and software platform operative as a distributed system of modules and computing elements.

Platform 100 may be embodied as, for example, but not be limited to, a website, a web application, a desktop application, backend application, and a mobile application compatible with a computing device 1000. The computing device 1000 may comprise, but not be limited to one or more of the following:

- A mobile computing device, such as, but is not limited to, a laptop, a tablet, a smartphone, a drone, a wearable, an embedded device, a handheld device, an Arduino, an industrial device, or a remotely operable recording device;
- A supercomputer, an exa-scale supercomputer, a mainframe, or a quantum computer;
- A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series; and
- A microcomputer, wherein the microcomputer computing device comprises, but is not limited to, a server, wherein a server may be rack mounted, a workstation, an industrial device, a raspberry pi, a desktop, or an embedded device.

Platform 100 may be hosted on a centralized server or a cloud computing service. Although method 400 has been described to be performed by a computing device 1000, it should be understood that, in some embodiments, different operations may be performed by a plurality of the computing devices 1000 in operative communication at least one network.

Embodiments of the present disclosure may comprise a system having a central processing unit (CPU) 1020, a bus 1030, a memory unit 1040, a power supply unit (PSU) 1050, and one or more Input/Output (I/O) units. The CPU 1020 coupled to the memory unit 1040 and the plurality of I/O units 1060 via the bus 1030, all of which are powered by the PSU 1050. It should be understood that, in some embodiments, each disclosed unit may actually be a plurality of such units for the purposes of redundancy, high availability, and/or performance. The combination of the presently disclosed units is configured to perform the stages any method disclosed herein.

Figure 10:
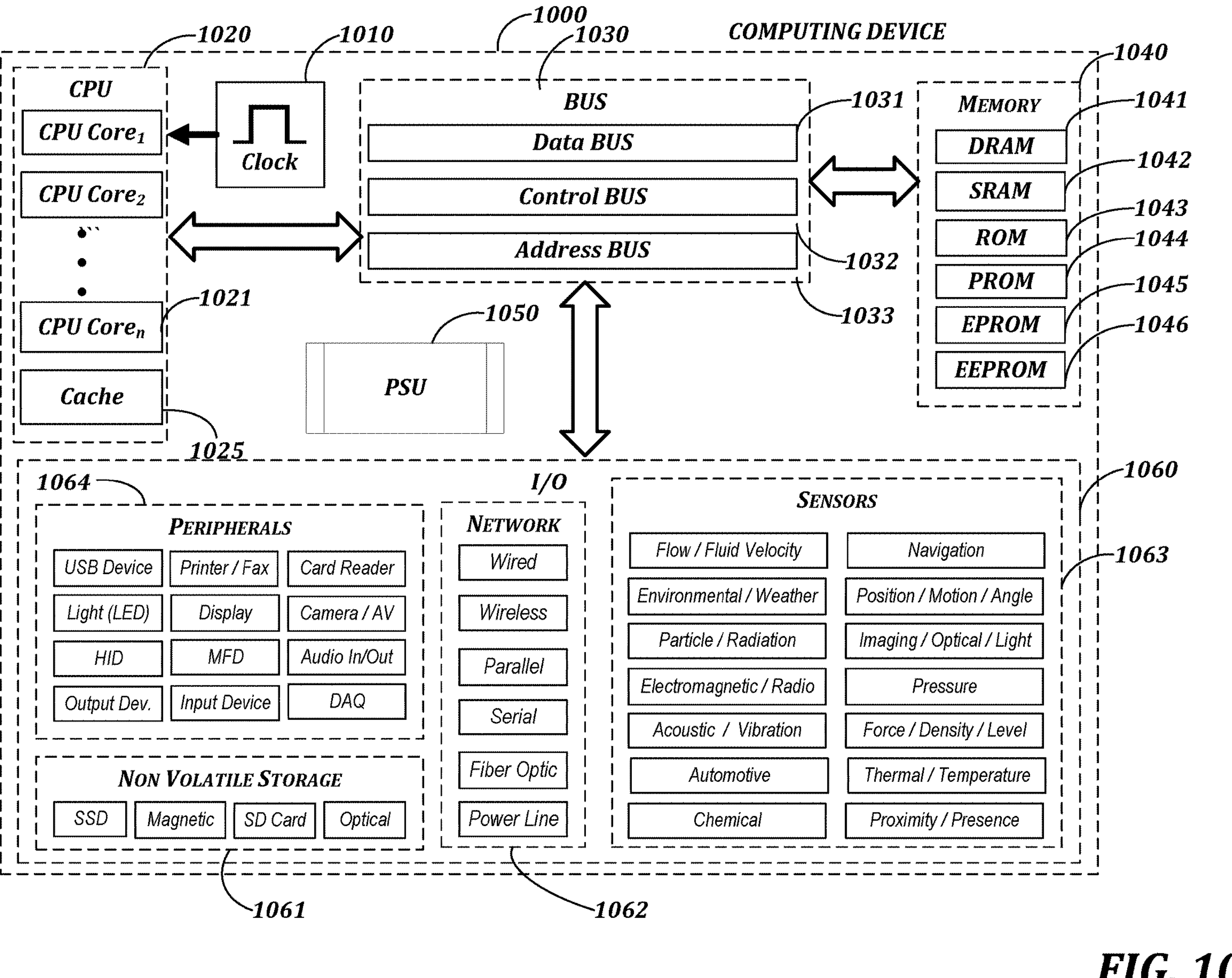
FIG. 10 is a block diagram of a system including a computing device for performing and operating at least portions the methods and systems disclosed herein.

FIG. 10 is a block diagram of a system including computing device 1000. Consistent with various embodiments of the disclosure, the aforementioned CPU 1020, the bus 1030, the memory unit 1040, a PSU 1050, and the plurality of I/O units 1060 may be implemented in a computing device, such as computing device 1000 of FIG. 10. Any suitable combination of hardware, software, or firmware may be used to implement the aforementioned units. For example, the CPU 1020, the bus 1030, and the memory unit 1040 may be implemented with computing device 1000 or any of other computing devices 1000, in combination with computing device 1000. The aforementioned system, device, and components are examples and other systems, devices, and components may comprise the aforementioned CPU 1020, the bus 1030, the memory unit 1040, consistent with embodiments of the disclosure.

At least one computing device 1000 may be embodied as any of the computing elements illustrated in all of the attached figures. A computing device 1000 does not need to be electronic, nor even have a CPU 1020, nor bus 1030, nor memory unit 1040. The definition of the computing device 1000 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 1000, especially if the processing is purposeful.

With reference to FIG. 10, a system consistent with various embodiments of the disclosure may include a computing device, such as computing device 1000. In a basic configuration, computing device 1000 may include at least one clock module 1010, at least one CPU 1020, at least one bus 1030, and at least one memory unit 1040, at least one PSU 1050, and at least one I/O 1060 module, wherein I/O module may be comprised of, but not limited to a non-volatile storage sub-module 1061, a communication sub-module 1062, a sensors sub-module 1063, and a peripherals sub-module 1064.

A system consistent with various embodiments of the disclosure the computing device 1000 may include the clock module 1010 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 1020, the central component of modern computers, which relies on a clock. The only exceptions are asynchronous circuits such as asynchronous CPUs. The clock 1010 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 1000 use a "clock multiplier" which multiplies a lower frequency external clock to the appropriate clock rate of the CPU 1020. This allows the CPU 1020 to operate at a much higher frequency than the rest of the computer, which affords performance gains in situations where the CPU 1020 does not need to wait on an external factor (like memory 1040 or input/output 1060). Some embodiments of the clock 1010 may include dynamic frequency change, where the time between clock edges can vary widely from one edge to the next and back again.

A system consistent with various embodiments of the disclosure the computing device 1000 may include the CPU unit 1020 comprising at least one CPU Core 1021. A plurality of CPU cores 1021 may comprise identical CPU cores 1021, such as, but not limited to, homogeneous multi-core systems. It is also possible for the plurality of CPU cores 1021 to comprise different CPU cores 1021, such as, but not limited to, heterogeneous multi-core systems, big.LITTLE systems and some AMD accelerated processing units (APU). The CPU unit 1020 reads and executes program instructions which may be used across many application domains, for example, but not limited to, general purpose computing, embedded computing, network computing, digital signal processing (DSP), and graphics processing (GPU). The CPU unit 1020 may run multiple instructions on separate CPU cores 1021 at the same time. The CPU unit 1020 may be integrated into at least one of a single integrated circuit die and multiple dies in a single chip package. The single integrated circuit die and multiple dies in a single chip package may contain a plurality of other aspects of the computing device 1000, for example, but not limited to, the clock 1010, the CPU 1020, the bus 1030, the memory 1040, and I/O 1060.

The CPU unit 1020 may contain cache 1022 such as, but not limited to, a level 1 cache, level 2 cache, level 3 cache or combination thereof. The aforementioned cache 1022 may or may not be shared amongst a plurality of CPU cores 1021. The cache 1022 sharing comprises at least one of message passing and inter-core communication methods may be used for the at least one CPU Core 1021 to communicate with the cache 1022. The inter-core communication methods may comprise, but not limited to, bus, ring, two-dimensional mesh, and crossbar. The aforementioned CPU unit 1020 may employ symmetric multiprocessing (SMP) design.

The plurality of the aforementioned CPU cores 1021 may comprise soft microprocessor cores on a single field programmable gate array (FPGA), such as semiconductor intellectual property cores (IP Core). The plurality of CPU cores 1021 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 1021, for example, but not limited to Instruction-level parallelism (ILP) such as, but not limited to, superscalar pipelining, and Thread-level parallelism (TLP).

Consistent with the embodiments of the present disclosure, the aforementioned computing device 1000 may employ a communication system that transfers data between components inside the aforementioned computing device 1000, and/or the plurality of computing devices 1000. The aforementioned communication system will be known to a person having ordinary skill in the art as a bus 1030. The bus 1030 may embody internal and/or external plurality of hardware and software components, for example, but not limited to a wire, optical fiber, communication protocols, and any physical arrangement that provides the same logical function as a parallel electrical bus. The bus 1030 may comprise at least one of, but not limited to a parallel bus, wherein the parallel bus carry data words in parallel on multiple wires, and a serial bus, wherein the serial bus carry data in bit-serial form. The bus 1030 may embody a plurality of topologies, for example, but not limited to, a multidrop/electrical parallel topology, a daisy chain topology, and a connected by switched hubs, such as USB bus. The bus 1030 may comprise a plurality of embodiments, for example, but not limited to:

Internal data bus (data bus) 1031/Memory bus
Control bus 1032
Address bus 1033
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 1000 may employ hardware integrated circuits that store information for immediate use in the computing device 1000, know to the person having ordinary skill in the art as primary storage or memory 1040. The memory 1040 operates at high speed, distinguishing it from the non-volatile storage sub-module 1061, which may be referred to as secondary or tertiary storage, which provides slow-to-access information but offers higher capacities at lower cost. The contents contained in memory 1040, may be transferred to secondary storage via techniques such as, but not limited to, virtual memory and swap. The memory 1040 may be associated with addressable semiconductor memory, such as integrated circuits consisting of silicon-based transistors, used for example as primary storage but also other purposes in the computing device 1000. The memory 1040 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

- Volatile memory which requires power to maintain stored information, for example, but not limited to, Dynamic Random-Access Memory (DRAM) 1041, Static Random-Access Memory (SRAM) 1042, CPU Cache memory 1025, Advanced Random-Access Memory (A-RAM), and other types of primary storage such as Random-Access Memory (RAM).
- Non-volatile memory which can retain stored information even after power is removed, for example, but not limited to, Read-Only Memory (ROM) 1043, Programmable ROM (PROM) 1044, Erasable PROM (EPROM) 1045, Electrically Erasable PROM (EEPROM) 1046 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.
- Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 1000 may employ the communication system between an information processing system, such as the computing device 1000, and the outside world, for example, but not limited to, human, environment, and another computing device 1000. The aforementioned communication system will be known to a person having ordinary skill in the art as I/O 1060. The I/O module 1060 regulates a plurality of inputs and outputs with regard to the computing device 1000, wherein the inputs are a plurality of signals and data received by the computing device 1000, and the outputs are the plurality of signals and data sent from the computing device 1000. The I/O module 1060 interfaces a plurality of hardware, such as, but not limited to, non-volatile storage 1061, communication devices 1062, sensors 1063, and peripherals 1064. The plurality of hardware is used by the at least one of, but not limited to, human, environment, and another computing device 1000 to communicate with the present computing device 1000. The I/O module 1060 may comprise a plurality of forms, for example, but not limited to channel I/O, port mapped I/O, asynchronous I/O, and Direct Memory Access (DMA).

Consistent with the embodiments of the present disclosure, the aforementioned computing device 1000 may employ the non-volatile storage sub-module 1061, which may be referred to by a person having ordinary skill in the art as one of secondary storage, external memory, tertiary storage, off-line storage, and auxiliary storage. The non-volatile storage sub-module 1061 may not be accessed directly by the CPU 1020 without using intermediate area in the memory 1040. The non-volatile storage sub-module 1061 does not lose data when power is removed and may be two orders of magnitude less costly than storage used in memory module, at the expense of speed and latency. The non-volatile storage sub-module 1061 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (1061) may comprise a plurality of embodiments, such as, but not limited to:

- Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).
- Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.
- Magnetic storage such as, but not limited to, Hard Disk Drive (HDD), tape drive, carousel memory, and Card Random-Access Memory (CRAM).
- Phase-change memory
- Holographic data storage such as Holographic Versatile Disk (HVD).
- Molecular Memory
- Deoxyribonucleic Acid (DNA) digital data storage Consistent with the embodiments of the present disclosure, the aforementioned computing device 1000 may employ the communication sub-module 1062 as a subset of the I/O 1060, which may be referred to by a person having ordinary skill in the art as at least one of, but not limited to, computer network, data network, and network. The network allows computing devices 1000 to exchange data using connections, which may be known to a person having ordinary skill in the art as data links, between network nodes. The nodes comprise network computer devices 1000 that originate, route, and terminate data. The nodes are identified by network addresses and can include a plurality of hosts consistent with the embodiments of a computing device 1000. The aforementioned embodiments include, but not limited to personal computers, phones, servers, drones, and networking devices such as, but not limited to, hubs, switches, routers, modems, and firewalls.

Two nodes can be said are networked together, when one computing device 1000 is able to exchange information with the other computing device 1000, whether or not they have a direct connection with each other. The communication sub-module 1062 supports a plurality of applications and services, such as, but not limited to World Wide Web (WWW), digital video and audio, shared use of application and storage computing devices 1000, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 1062 may comprise a plurality of size, topology, traffic control mechanism and organizational intent. The communication sub-module 1062 may comprise a plurality of embodiments, such as, but not limited to:

- Wired communications, such as, but not limited to, coaxial cable, phone lines, twisted pair cables (ethernet), and InfiniBand.
- Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G,4G (such as WiMax and LTE), and 5G (short and long wavelength).
- Parallel communications, such as, but not limited to, LPT ports.
- Serial communications, such as, but not limited to, RS-232 and USB.
- Fiber Optic communications, such as, but not limited to, Single-mode optical fiber (SMF) and Multi-mode optical fiber (MMF).
- Power Line communications The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 1000 may employ the sensors sub-module 1063 as a subset of the I/O 1060. The sensors sub-module 1063 comprises at least one of the devices, modules, and subsystems whose purpose is to detect events or changes in its environment and send the information to the computing device 1000. Sensors are sensitive to the measured property, are not sensitive to any property not measured, but may be encountered in its application, and do not significantly influence the measured property. The sensors sub-module 1063 may comprise a plurality of digital devices and analog devices, wherein if an analog device is used, an Analog to Digital (A-to-D) converter must be employed to interface the said device with the computing device 1000. The sensors may be subject to a plurality of deviations that limit sensor accuracy. The sensors sub-module 1063 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

- Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).
- Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.
- Acoustic, sound and vibration sensors, such as, but not limited to, microphone, lace sensor (guitar pickup), seismometer, sound locator, geophone, and hydrophone.
- Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.
- Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.
- Flow and fluid velocity sensors, such as, but not limited to, air flow meter, anemometer, flow sensor, gas meter, mass flow sensor, and water meter.
- Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.
- Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 1000 may employ the peripherals sub-module 1062 as a subset of the I/O 1060. The peripheral sub-module 1064 comprises ancillary devices uses to put information into and get information out of the computing device 1000. There are 3 categories of devices comprising the peripheral sub-module 1064, which exist based on their relationship with the computing device 1000, input devices, output devices, and input/output devices. Input devices send at least one of data and instructions to the computing device 1000. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 1000. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 1064:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, which require up to six degrees of freedom such as, but not limited to, camera gimbals, Cave Automatic Virtual Environment (CAVE), and virtual reality systems.

Video Input devices are used to digitize images or video from the outside world into the computing device 1000. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 1000 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices convert at least one of analog signals and physical parameters to digital values for processing by the computing device 1000. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Robotic actuators, which cause movement of at least a portion of the robotic assistance device, may include electric motors that rotate a wheel or gear, linear actuators that extend or retract to cause linear movement, series elastic actuators, pneumatic artificial muscles, shape memory alloy wire, electroactive polymers, piezoelectric motors, elastic nanotubes, and the like.

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC).

Input/Output Devices may further comprise, but not be limited to, touchscreens, networking device (e.g., devices disclosed in network 1062 sub-module), data storage device (non-volatile storage 1061), facsimile (FAX), and graphics/sound cards.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and quantum computing elements. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Aspects

The following discloses various Aspects of the present disclosure. The various Aspects are not to be construed as patent claims unless the language of the Aspect appears as a patent claim. The Aspects describe various non-limiting embodiments of the present disclosure.

A method comprising:

a. determining, by one or more sensors on a resupply management apparatus (RMA), data comprising:

i. a quantity of resources stored in the RMA,
ii. a rate of change of the quantity of resources stored in the RMA, and
iii. a geographic location of the RMA;
b. transmitting, from the RMA to a resource optimization processing system (ROPS), the determined data;
c. receiving, at the RMA and from the ROPS, resource exchange information comprising:
i. a location for resource exchange, and
ii. an indication of a device with which to exchange resources;
d. directing a motion of the RMA to the indicated location specified in the resource exchange information; and
e. exchanging resources with the indicated device at the location.

The method of Aspect 1, further comprising:
a. receiving, from a secondary device, resource supply data to be transmitted to the ROPS; and
b. transmitting the received resource supply data to the ROPS.

The method of Aspect 1, wherein transmitting the determined data to the ROPS comprises transmitting the determined data to a secondary device configured to forward the determined data to the ROPS.

The method of Aspect 1, wherein the RMA is first RMA of a plurality of networked RMAs, and wherein the plurality of networked RMAs form a dynamic grid to resupply one or more of an end use client device and a centralized resource hub.

The method of Aspect 4, wherein the resource exchange info is configured to adjust the dynamic grid in a way that predicts the supply needs of one or more of the end use client device and the centralized resource hub.

The method of Aspect 1, wherein the determined data comprises an indication that the RMA is coupled to a host device.

The method of Aspect 6, wherein the determined data comprises diagnostic data associated with the coupled host device.

The method of Aspect 6, wherein the determined data comprises metadata associated with the coupled host device.

The method of Aspect 6, wherein the determined data comprises an indication of a device type of the coupled host device.

The method of Aspect 1, wherein the determined data comprises an indication that the RMA is not coupled to a host device.

The method of Aspect 1, wherein the determined data comprises diagnostic data associated with the RMA.

The method of Aspect 1, wherein the determined data comprises metadata associated with the RMA.

The method of Aspect 1, wherein the resource exchange information further comprises a quantity of the resources to exchange.

The method of Aspect 1, wherein the resource exchange information further comprises routing information for transit of the RMA from a current location to the indicated location.

The method of Aspect 1, wherein moving the RMA to the indicated location comprises causing a host device coupled to the RMA to move to the indicated location.

The method of Aspect 1, wherein moving the RMA to the indicated location comprises:
a. causing the RMA to couple to a host device capable of locomotion; and
b. causing the host device to move to the location.

The method of Aspect 1, wherein exchanging the resources with the indicated device at the indicated location comprises:
a. initiating a handshake protocol between the RMA and the indicated device;
b. responsive to successful completion of the handshake protocol, docking the RMA to the indicated device; and
c. executing exchange of the resources between the RMA and the indicated device.

The method of Aspect 1, wherein exchanging the resources comprises moving the resources from the RMA to the indicated device.

The method of Aspect 1, wherein exchanging the resources comprises moving the resources from the indicated device to the RMA.

The method of Aspect 1, wherein exchanging the resources comprises:
a. decoupling the RMA from a host device; and
b. coupling the RMA to the indicated device.

A method comprising:
a. receiving, from a resupply management apparatus (RMA), data comprising:
i. a quantity of resources stored in the RMA,
ii. a rate of change of the quantity of resources stored in the RMA, and
iii. a geographic location of the RMA;
b. applying an Artificial Intelligence model to the received data to determine resource exchange information comprising:
i. a location for resource exchange,
ii. an indication of a device with which to exchange resources, and
iii. one or more instructions that, when executed, cause the RMA to move to the location and exchange the resources with the indicated device; and
c. transmitting the resource exchange information to the RMA.

The method of Aspect 21, wherein receiving the data from the RMA comprises receiving data associated with the RMA from a secondary device.

The method of Aspect 21, wherein transmitting the resource exchange data to the RMA comprises transmitting the resource exchange data to a secondary device configured to forward the resource exchange data to the RMA.

The method of Aspect 21, wherein the Artificial Intelligence model is a trained Artificial Intelligence model, and wherein training the Artificial Intelligence model comprises:
a. obtaining training data sets, each training data set including historical data comprising:
i. attributes of a particular RMA status,
ii. attributes of one or more of an end use client device and a centralized resource hub;
iii. a particular set of resource exchange information provided to the RMA, and
iv. a particular level of acceptability of the particular set of resource exchange information; and
b. training the Artificial Intelligence model based on the training data sets.

The method of Aspect 21, wherein applying the Artificial Intelligence model comprises:
a. analyzing the received data to determine resource exchange information; and
b. computing a level of acceptability based on the received data and the supply exchange information.

The method of Aspect 21, wherein the resource exchange information further comprises a quantity of the resources to exchange.

The method of Aspect 21, wherein the resource exchange information further comprises routing information for directing the RMA from a current location to the indicated location.

The method of Aspect 21, further comprising:

a. receiving, from the indicated device, location information specifying a location of the indicated device; and
b. transmitting at least a portion of the resource exchange information to the indicated device.

The method of Aspect 28, wherein the resource exchange information further comprises one or more instructions that, when executed, cause the indicated device to move to the indicated location.

The method of Aspect 28, wherein the resource exchange information further comprises routing information for directing the indicated device to the indicated location.

The method of Aspect 28, wherein the resource exchange information further comprises one or more instructions that, when executed, cause the indicated device and the RMA to initiate a handshake procedure, and wherein executing exchange of the resources is performed in response to completion of the handshake procedure.

The method of Aspect 21, further comprising:

a. receiving, from the RMA, an indication that the resource exchange has been completed.

One or more non-transitory computer readable media comprising instructions which, when executed by one or more hardware processors, causes performance of operations comprising:

a. receiving, from a resupply management apparatus (RMA), data comprising:
   i. a quantity of resources stored in the RMA,
   ii. a rate of change of the quantity of resources stored in the RMA, and
   iii. a geographic location of the RMA;
b. applying an Artificial Intelligence model to the received data to determine resource exchange information comprising:
   i. a location for resource exchange,
   ii. an indication of a device with which to exchange resources, and
   iii. one or more instructions that, when executed, cause the RMA to move to the location and exchange the resources with the indicated device; and
c. transmitting the resource exchange information to the RMA.

The non-transitory computer readable media of Aspect 33, wherein receiving the data from the RMA comprises receiving data associated with the RMA from a secondary device.

The non-transitory computer readable media of Aspect 33, wherein transmitting the resource exchange data to the RMA comprises transmitting the resource exchange data to a secondary device configured to forward the resource exchange data to the RMA.

The non-transitory computer readable media of Aspect 33, wherein the Artificial Intelligence model is a trained Artificial Intelligence model, and wherein training the Artificial Intelligence model comprises:

a. obtaining training data sets, each training data set including historical data comprising:
   i. attributes of a particular RMA status,
   ii. a particular set of resource exchange information provided to the RMA, and
   iii. a particular level of acceptability of the particular set of resource exchange information; and
b. training the Artificial Intelligence model based on the training data sets.

The non-transitory computer readable media of Aspect 33, wherein applying the Artificial Intelligence model comprises:

a. analyzing the received data to determine resource exchange information; and
b. computing a level of acceptability based on the received data and the resource exchange information.

The non-transitory computer readable media of Aspect 33, wherein the resource exchange information further comprises a quantity of the resources to exchange.

The non-transitory computer readable media of Aspect 33, wherein the resource exchange information further comprises routing information for directing the RMA to the location.

The non-transitory computer readable media of Aspect 33, the operations further comprising:

a. receiving, from the indicated device, location information specifying a location of the indicated device; and
b. transmitting at least a portion of the resource exchange information to the indicated device.

The non-transitory computer readable media of Aspect 40, wherein the resource exchange information further comprises one or more instructions that, when executed, cause the indicated device to move to the location.

The non-transitory computer readable media of Aspect 40, wherein the resource exchange information further comprises routing information for directing the indicated device to the indicated location.

The non-transitory computer readable media of Aspect 40, wherein the resource exchange information further comprises one or more instructions that, when executed, cause the indicated device and the RMA to initiate a handshake procedure, and wherein executing exchange of the resources is performed in response to completion of the handshake procedure.

The non-transitory computer readable media of Aspect 33, the operations further comprising:

a. receiving, from the RMA, an indication that the resource exchange has been completed.

A resupply management apparatus (RMA), the apparatus comprising:

a. a resource container configured to hold a supply of a particular resource;
b. an inventory sensor connected to the resource container, the inventory sensor configured to measure:
   i. a quantity of the particular resource held in the resource container, and
   ii. a rate of change of the quantity;
c. a location sensor for determining a location of the RMA;
d. a wireless communication device configured to transmit data to a resource optimization processing system (ROPS), and to receive data from the ROPS; and
e. means for propelling the RMA through space.

The apparatus of Aspect 45, wherein receiving the data from the ROPS comprises receiving data associated with the ROPS from a secondary device.

The apparatus of Aspect 45, wherein transmitting the data to the ROPS comprises transmitting the data to a secondary device configured to forward the data to the ROPS.

The apparatus of Aspect 45, wherein the RMA is first RMA of a plurality of networked RMAs, and wherein the plurality of networked RMAs form a dynamic grid to resupply one or more of an end use client device and a centralized resource hub.

The apparatus of Aspect 48, wherein the resource exchange info is configured to adjust the dynamic grid in a way that predicts the supply needs of one or more of the end use client device and the centralized resource hub.

The apparatus of Aspect 45, wherein the means for propelling the RMA through space comprises a means for coupling the RMA to a movable device.

The apparatus of Aspect 45, wherein the means for propelling the RMA comprises one or more propellers.

The apparatus of Aspect 45, wherein the means for propelling the RMA comprises one or more wheels.

The apparatus of Aspect 45, wherein the means for propelling the RMA comprises one or more treads.

The apparatus of Aspect 45, wherein the location sensor comprises a global positioning system (GPS) sensor.

The apparatus of Aspect 45, wherein the wireless communication device is further configured to communicate with one or more devices for performing a handshake procedure to verify device identity.

The apparatus of Aspect 45, wherein the resource container further comprises a dock for connecting the resource container to a particular device, and wherein the resource container is configured to receive the particular resource from the particular device into the resource container via the dock.

The apparatus of Aspect 45, wherein the resource container further comprises a dock for connecting the resource container to a particular device, and wherein the resource container is configured to transfer the particular resource to the particular device from the resource container via the dock.

The apparatus of Aspect 45, wherein the resource container is removably attachable to the apparatus, and wherein the apparatus is configured to detach the resource container.

A resupply management system, comprising:

a. an RMA according to any one of Aspects 36-45;

b. a centralized resource hub, including:

c. a first interface configured to exchange a resource with an external device, d. a central repository configured to retain the resource, and e. a dock configured to connect to the RMA for exchange of the resource between the RMA and the centralized resource hub; and f. a host device configured to be coupled to the RMA.

The resupply management system of Aspect 59, wherein receiving the data from the RMA comprises receiving data associated with the RMA from a secondary device.

The resupply management system of Aspect 59, wherein transmitting the resource exchange data to the RMA comprises transmitting the resource exchange data to a secondary device configured to forward the resource exchange data to the RMA.

The resupply management system of Aspect 59, wherein the RMA is first RMA of a plurality of networked RMAs, and wherein the plurality of networked RMAs form a dynamic grid to resupply one or more of an end use client device and the centralized resource hub.

The resupply management system of Aspect 62, wherein the resource exchange info is configured to adjust the dynamic grid in a way that predicts the supply needs of one or more of the end use client device and the centralized resource hub.

The resupply management system of Aspect 59, wherein the central hub is configured to acquire hub data indicating at least a quantity of the resource stored in the central repository and a rate of change of the quantity of the resource stored in the central repository.

The resupply management system of Aspect 64, wherein the centralized hub is configured to transmit, to a resource optimization processing system (ROPS), at least a location of the centralized hub and the hub data.

The resupply management system of Aspect 59, wherein the host device comprises an end use client device, and wherein the end use client device is configured to gather the resources for storage in the RMA.

The resupply management system of Aspect 59, wherein the host device comprises an end use client device, and wherein the end use client device is configured to utilize the resources from the RMA.

The resupply management system of Aspect 59, wherein the centralized resource hub comprises a means of locomotion.

The resupply management system of Aspect 59, wherein the host device comprises a means of locomotion.

The resupply management system of Aspect 59, wherein the RMA is configured to exchange data with the host device.

The resupply management system of Aspect 59, wherein the host device comprises an end use client device configured to make use of the resource.

The resupply management system of Aspect 59, wherein the host device comprises a delivery robot configured to transport the resource to an end use client device.

A resupply management system, comprising:

a. an RMA according to any one of Aspects 36-45;

b. a centralized resource hub, including:

i. a first interface configured to exchange a resource with an external device, ii. a central repository configured to retain the resource, iii. a hub dock configured to connect to the RMA for exchange of the resource between the RMA and the centralized resource hub, iv. one or more hub sensors configured to measure data associated with the centralized resource hub, and v. a second wireless communication device configured to transfer data to a resource optimization processing system (ROPS), and to receive data from the ROPS;

c. an end use client device including:

i. a client storage configured to retain the resource, ii. one or more client sensors configured to measure data associated with the end use client device, iii. a client dock configured to connect to the RMA for exchange of the resource between the end use client device and the RMA, and iv. a third wireless communication device configured to transfer the data associated with the end use client device to the ROPS, and to receive data from the ROPS; and d. an intermediary robot configured to transport the resource between the end use client device and the centralized resource hub, the delivery robot including:

i. a means of locomotion, ii. a coupling mechanism configured to connect to the RMA, iii. a fourth wireless communication device configured to transfer the data associated with the delivery robot to the ROPS, and to receive data from the ROPS.

The resupply management system of Aspect 73, wherein the first wireless communication device of the RMA is configured to transfer data to the ROPS via one or more of the second wireless communication device, the third wireless communication device, or the fourth wireless communication device.

The resupply management system of Aspect 73, wherein the second wireless communication device of the RMA is configured to transfer data to the ROPS via one or more of the first wireless communication device, the third wireless communication device, or the fourth wireless communication device.

The resupply management system of Aspect 73, wherein the third wireless communication device of the RMA is configured to transfer data to the ROPS via one or more of the first wireless communication device, the second wireless communication device, or the fourth wireless communication device.

The resupply management system of Aspect 73, wherein the fourth wireless communication device of the RMA is configured to transfer data to the ROPS via one or more of the first wireless communication device, the second wireless communication device, or the third wireless communication device.

The resupply management system of Aspect 73, wherein the RMA is first RMA of a plurality of networked RMAs, and wherein the plurality of networked RMAs form a dynamic grid to resupply one or more of the end use client device and the centralized resource hub.

The resupply management system of Aspect 78, wherein the resource exchange info is configured to adjust the dynamic grid in a way that predicts the supply needs of one or more of the end use client device and the centralized resource hub.

The resupply management system of Aspect 73, wherein the coupling mechanism comprises a delivery robot dock configured to connect to the RMA for exchange of the resource between the intermediary robot and the RMA.

The resupply management system of Aspect 73, wherein the coupling mechanism comprises a communication interface for transferring data between the RMA and the intermediary robot.

The resupply management system of Aspect 81, wherein the transferred data comprises one or more commands, transferred from the RMA to the intermediary robot that, when executed by the intermediary robot, cause the intermediary robot to move to a particular location.

The resupply management system of Aspect 73, wherein the data associated with the centralized resource hub comprises a quantity of the resource stored in the central repository and a rate of change of the quantity of the resource stored in the central repository.

The resupply management system of Aspect 73, wherein the centralized resource hub is configured to transmit, to the resource optimization processing system (ROPS), at least a location of the centralized resource hub and the data associated with the centralized resource hub.

The resupply management system of Aspect 73, wherein the centralized resource hub comprises a means of locomotion.

The resupply management system of Aspect 73, wherein the data associated with the end use client device comprises a quantity of the resource stored in the client storage and a rate of change of the quantity of the resource stored in the client storage.

The resupply management system of Aspect 73, wherein the centralized hub is configured to transmit, to the resource optimization processing system (ROPS), at least a location of the end use client device and the data associated with the end use client device.

The resupply management system of Aspect 73, wherein the RMA is configured to exchange data with the end use client device.

The resupply management system of Aspect 73, wherein the client dock is configured to connect to the RMA to transfer the resource from the end use client device to the RMA.

The resupply management system of Aspect 73, wherein the client dock is configured to connect to the RMA to transfer the resource from the RMA to the end use client device.

The resupply management system of Aspect 73, wherein the intermediary robot is configured to transmit, to the resource optimization processing system (ROPS), at least a location of the intermediary robot and data associated with the intermediary robot.

The resupply management system of Aspect 73, wherein the RMA is configured to exchange data with the intermediary robot.

The resupply management system of Aspect 73, wherein the coupling device comprises an intermediary robot dock configured to connect to the RMA to transfer the resource from the intermediary robot to the RMA.

The resupply management system of Aspect 73, wherein the coupling device comprises an intermediary robot dock configured to connect to the RMA to transfer the resource from the RMA to the intermediary robot.

The resupply management system of Aspect 73, wherein the coupling device comprises a device configured to couple the RMA to the intermediary robot such that the intermediary robot moves the RMA.

The resupply management system of Aspect 54, wherein the coupling device comprises a releasable coupling device.

A resupply management system comprising:

a. a centralized resource hub, including:
   i. a first interface configured to exchange a resource with an external device,
   ii. a central repository configured to retain the resource,
   iii. a hub dock configured to connect to the RMA for exchange of the resource between the RMA and the centralized resource hub,
   iv. one or more hub sensors configured to measure data associated with the centralized resource hub, and
   v. a second wireless communication device configured to transfer data to a resource optimization processing system (ROPS), and to receive data from the ROPS;
b. an end use client device including:
   i. a client storage configured to retain the resource,
   ii. one or more client sensors configured to measure data associated with the end use client device,
   iii. a client dock configured to connect to the RMA for exchange of the resource between the end use client device and the RMA, and
   iv. a third wireless communication device configured to transfer the data associated with the end use client device to the ROPS, and to receive data from the ROPS;
c. a delivery robot configured to transport the resource between the end use client device and the centralized resource hub, the delivery robot including:
   i. a means of locomotion,
   ii. a coupling mechanism configured to connect to the RMA,
   iii. a fourth wireless communication device configured to transfer the data associated with the delivery robot to the ROPS, and to receive data from the ROPS;

d. a resupply management assembly (RMA), including:
  i. an RMA coupling device for coupling to a host device selected from a group consisting of the end use client device, the delivery robot, and the central hub,
  ii. an RMA storage configured to retain the resource,
  iii. one or more RMA sensors configured to measure data associated with the RMA,
  iv. a fourth wireless communication device configured to transfer data to the ROPS, and to receive data from the ROPS; and
e. the ROPS including:
  i. a fifth wireless communication device configured to receive data from one or more other devices, and to command signals to the one or more other devices, and
  ii. a ROPS processing unit configured to perform optimization processing, based at least in part on the data received from the one or more other devices, to produce the command signals.

The resupply management system of Aspect 97, wherein the first wireless communication device of the RMA is configured to transfer data to the ROPS via one or more of the second wireless communication device, the third wireless communication device, or the fourth wireless communication device.

The resupply management system of Aspect 97, wherein the second wireless communication device of the RMA is configured to transfer data to the ROPS via one or more of the first wireless communication device, the third wireless communication device, or the fourth wireless communication device.

The resupply management system of Aspect 97, wherein the third wireless communication device of the RMA is configured to transfer data to the ROPS via one or more of the first wireless communication device, the second wireless communication device, or the fourth wireless communication device.

The resupply management system of Aspect 97, wherein the fourth wireless communication device of the RMA is configured to transfer data to the ROPS via one or more of the first wireless communication device, the second wireless communication device, or the third wireless communication device.

The resupply management system of Aspect 97, wherein the RMA is first RMA of a plurality of networked RMAs, and wherein the plurality of networked RMAs form a dynamic grid to resupply one or more of the end use client device and the centralized resource hub.

The resupply management system of Aspect 102, wherein the resource exchange info is configured to adjust the dynamic grid in a way that predicts the supply needs of one or more of the end use client device and the centralized resource hub.

The resupply management system of Aspect 97, wherein the coupling mechanism comprises a delivery robot dock configured to connect to the RMA for exchange of the resource between the delivery robot and the RMA.

The resupply management system of Aspect 97, wherein the coupling mechanism comprises a communication interface for transferring data between the RMA and the delivery robot.

The resupply management system of Aspect 97, wherein the transferred data comprises one or more commands, transferred from the RMA to the delivery robot that, when executed by the delivery robot, cause the delivery robot to move to a particular location.

The resupply management system of Aspect 97, wherein the data associated with the centralized resource hub comprises a quantity of the resource stored in the central repository and a rate of change of the quantity of the resource stored in the central repository.

The resupply management system of Aspect 97, wherein the centralized hub is configured to transmit, to the resource optimization processing system (ROPS), at least a location of the centralized hub and the data associated with the centralized resource hub.

The resupply management system of Aspect 97, wherein the centralized resource hub comprises a means of locomotion.

The resupply management system of Aspect 97, wherein the data associated with the end use client device comprises a quantity of the resource stored in the client storage and a rate of change of the quantity of the resource stored in the client storage.

The resupply management system of Aspect 97, wherein the centralized hub is configured to transmit, to the resource optimization processing system (ROPS), at least a location of the end use client device and the data associated with the end use client device.

The resupply management system of Aspect 97, wherein the RMA includes an RMA dock configured to connect to another device for exchange of the resource between the RMA and the other device.

The resupply management system of Aspect 97, wherein the RMA includes a resource resupply interface configured to facilitate exchange of the resource between the RMA and another device.

The resupply management system of Aspect 97, wherein the fourth wireless communication device is part of a communication and information processing component, the communications and information processing component configured to process information received from the one or more RMA sensors and to transmit the processed data to one or more other devices.

The resupply management system of Aspect 97, wherein the RMA includes a host material and communication interface, comprising:
a. a material interface configured to facilitate exchange of the resource between the RMA and the host device; and
b. a communication interface configured to exchange data between the RMA and the host device.

The resupply management system of Aspect 115, wherein the exchange of the data comprises transmitting one or more command signals from the RMA to the host device to facilitate locomotion of the RMA.

The resupply management system of Aspect 115, wherein the exchange of the data includes transmitting diagnostic data from the host device to the RMA for transmission to the ROPS.

The resupply management system of Aspect 97, wherein the exchange of the resources comprises exchange of bulk resources.

The resupply management system of Aspect 97, wherein the exchange of the resources comprises exchange of containerized resources.

The resupply management system of Aspect 97, wherein the command signals comprise at least one of:
a. an indication of a location to move to,
b. an indication of a route to take to the location,
c. a device with which to exchange resources, or
d. a quantity of the resources to exchange.

The resupply management system of Aspect 97, wherein the ROPS processing unit comprises an Artificial Intelligence model for selecting the one or more command signals.

The resupply management system of Aspect 97, wherein the ROPS processing unit receives information indicating one or more of:

a. a client device location,
b. a prioritization configuration,
c. a device route configuration,
d. a resource level at a device, and
e. a resource use rate at a device; and
f. wherein the ROPS processing unit outputs commands that, when executed by one or more devices, produce an optimized resource distribution.

VI. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

The following is claimed:

1. A method comprising:

receiving data, from at least one resupply management apparatus (RMA) configured as a separate modular apparatus that couples to and commands navigation of a host vehicle;

the data comprising at least one of the following:

a quantity of resources stored associated with the at least one RMA, and a real-time geographic location and trajectory associated with the at least one RMA;

applying an Artificial Intelligence (AI) model to the received data to generate resource exchange data comprising:

a dynamically calculated resource exchange location based on predicted intercept coordinates of moving targets, an indication of at least one end use client device with which to exchange resources, and one or more navigation override instructions that, when executed, cause the at least one RMA to command the host vehicle to move to the resource exchange location and exchange at least a subset of the quantity of resources stored with the at least one end use client device; and transmitting the resource exchange data to the at least one RMA via a network communication protocol.

2. The method of claim 1, wherein receiving the data from the at least one RMA comprises receiving the data associated with the at least one RMA from a secondary device.

3. The method of claim 2, wherein transmitting the resource exchange data to the at least one RMA comprises transmitting the resource exchange data to the secondary device configured to forward the resource exchange data to the at least one RMA.

4. The method of claim 1, wherein the AI model is a trained AI model, and wherein training the AI model comprises:

obtaining training data sets, each training data set including historical mission outcome data comprising:

attributes of a particular RMA status, attributes of one or more of an end use client device and a centralized resource hub;

a particular set of resource exchange data provided to the particular RMA, actual mission success results for the particular set of resource exchange data, and a particular level of acceptability of the particular set of resource exchange data based on mission completion effectiveness; and training the AI model based on the training data sets to predict mission success probability for future resource exchange operations.

5. The method of claim 1, wherein applying the AI model comprises:

analyzing the received data to determine the resource exchange data using real-time kinetic trajectory calculations; and computing mission success acceptability level based on predicted intercept feasibility, resource availability, and environmental factors affecting the resource exchange data operation.

6. The method of claim 1, wherein the resource exchange data further comprises a quantity of the resources to exchange.

7. The method of claim 1, wherein the resource exchange data further comprises routing information for directing the at least one RMA from the real-time geographic location associated with the at least one RMA to the resource exchange location.

8. The method of claim 1, wherein the resource exchange data further comprises one or more instructions that, when executed, cause the at least one RMA to move to the resource exchange location.

9. The method of claim 8, wherein the resource exchange data further comprises routing information for directing the at least one RMA to the resource exchange location.

10. The method of claim 1, wherein the resource exchange data further comprises one or more instructions that, when executed, cause the at least one RMA and the at least one end use client device to initiate a physical device authentication handshake procedure for verifying device identity in field environments without network infrastructure.

11. The method of claim 10, further comprising executing exchange of the resources in response to successful completion of the physical device authentication handshake procedure confirming authorized resource transfer between verified autonomous devices.

12. The method of claim 11, further comprising:

receiving, from the at least one RMA, a cryptographically signed indication that the resource exchange has been completed and verified through autonomous device confirmation protocols.

* * * * *